United States Patent
Mertens

(10) Patent No.: US 10,182,247 B2
(45) Date of Patent: *Jan. 15, 2019

(54) HDR IMAGE ENCODING AND DECODING METHODS AND DEVICES

(71) Applicant: KONINKLIJKE PHILIPS N.V., Eindhoven (NL)

(72) Inventor: Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,528

(22) Filed: Jun. 7, 2017

(65) Prior Publication Data

US 2017/0339433 A1 Nov. 23, 2017

Related U.S. Application Data

(63) Continuation of application No. 14/762,821, filed as application No. PCT/IB2014/058848 on Feb. 7, 2014, now Pat. No. 9,699,482.

(Continued)

(51) Int. Cl.
*G06K 9/00* (2006.01)
*H04N 19/98* (2014.01)
(Continued)

(52) U.S. Cl.
CPC ............ *H04N 19/98* (2014.11); *G06T 5/009* (2013.01); *H04N 1/6058* (2013.01); *H04N 5/20* (2013.01);
(Continued)

(58) Field of Classification Search
CPC ........ H04N 19/98; H04N 1/6058; H04N 9/68; H04N 19/186; H04N 19/44; H04N 1/64;
(Continued)

(56) References Cited

U.S. PATENT DOCUMENTS 6,864,916 B1 * 3/2005 Nayar ................. H04N 5/2355
348/224.1
8,248,486 B1 * 8/2012 Ward ...................... H04N 9/67
348/222.1
(Continued)

FOREIGN PATENT DOCUMENTS

WO 2005104035 A1 11/2005
WO 2012147010 A1 11/2012
(Continued)

OTHER PUBLICATIONS

Kainz et al, "Technical Introduction to Openexr", Overview, Nov. 5, 2013, pp. 1-15.
(Continued)

*Primary Examiner* — Amir Alavi

(57) ABSTRACT

To allow graders to make optimally looking content of HDR scenes for various rendering displays, we invented an image encoder (202) comprising:
an input (240) for a high dynamic range input image (M_HDR);
an image grading unit (201) arranged to allow a human color grader to specify a color mapping from a representation (HDR_REP) of the high dynamic range input image defined according to a predefined accuracy, to a low dynamic range image (Im_LDR) by means of a human-determined color mapping algorithm, and arranged to output data specifying the color mapping (Fi(MP_DH)); and
an automatic grading unit (203) arranged to derive a second low dynamic range image (GT_IDR) by applying an automatic color mapping algorithm to one of the high dynamic range input image (M_HDR) or the low dynamic range image (Im_LDR). We also describe and
(Continued)

interesting new saturation processing strategy useful in the newly emerging high dynamic range image handling technology.

14 Claims, 14 Drawing Sheets

Related U.S. Application Data

(60) Provisional application No. 61/767,314, filed on Feb. 21, 2013, provisional application No. 61/868,111, filed on Aug. 21, 2013.

(51) Int. Cl.
    *H04N 19/186* (2014.01)
    *H04N 19/44* (2014.01)
    *H04N 1/60* (2006.01)
    *H04N 9/68* (2006.01)
    *G06T 5/00* (2006.01)
    *H04N 5/20* (2006.01)
    *H04N 1/64* (2006.01)

(52) U.S. Cl.
    CPC ............ *H04N 9/68* (2013.01); *H04N 19/186* (2014.11); *H04N 19/44* (2014.11); *G06T 2207/10024* (2013.01); *G06T 2207/20092* (2013.01); *G06T 2207/20208* (2013.01); *H04N 1/64* (2013.01)

(58) Field of Classification Search
    CPC ........... G06T 5/009; G06T 2207/10024; G06T 2207/20092; G06T 2207/20208
    See application file for complete search history.

(56) References Cited

U.S. PATENT DOCUMENTS

| | | | | |
|---|---|---|---|---|
| 8,831,343 | B2* | 9/2014 | Kunkel | H04N 1/6088 |
| | | | | 382/167 |
| 8,965,141 | B2* | 2/2015 | Jiang | G06K 9/40 |
| | | | | 382/261 |
| 9,020,257 | B2* | 4/2015 | El-Mahdy | G06T 5/009 |
| | | | | 348/207.1 |
| 9,098,906 | B2* | 8/2015 | Bruls | G06T 9/004 |
| 9,129,445 | B2* | 9/2015 | Mai | G06T 11/60 |
| 9,230,509 | B2* | 1/2016 | Van Der Vleuten | |
| | | | | H04N 1/6027 |
| 9,699,482 | B2* | 7/2017 | Mertens | H04N 1/6058 |
| 2012/0113130 | A1* | 5/2012 | Zhai | G06T 5/008 |
| | | | | 345/589 |
| 2012/0314944 | A1* | 12/2012 | Ninan | H04N 19/647 |
| | | | | 382/166 |
| 2013/0107956 | A1* | 5/2013 | Muijs | G06T 9/004 |
| | | | | 375/240.12 |
| 2015/0201222 | A1* | 7/2015 | Mertens | H04N 19/46 |
| | | | | 382/233 |
| 2015/0358646 | A1 | 12/2015 | Merten | |

FOREIGN PATENT DOCUMENTS

| | | |
|---|---|---|
| WO | 2012147018 A2 | 11/2012 |
| WO | 2012153224 A1 | 11/2012 |
| WO | 2013046095 A1 | 4/2013 |
| WO | 2014056679 A1 | 4/2014 |

OTHER PUBLICATIONS

Larson, "Overcoming GMUT and Dynamic Range Limitations in Digital Images", Proceedings of the Color Imaging Conference: Color Science, Systems and Applications, 1998, pp. 214-219.

Okubo Kakuno Kikuchi Suzuki, "H.264/AVC教科書", An Impress Group Company, 2009, Japan, pp. 1-4.

* cited by examiner

HDR IMAGE ENCODING AND DECODING METHODS AND DEVICES

CROSS REFERENCE TO PRIOR APPLICATIONS

This application is a Continuation application of U.S. Ser. No. 14/762,821, filed Jul. 23, 2015, which is a U.S. National Phase application under 35 U.S.C. § 371 of International Application No. PCT/IB2014/058848, filed on Feb. 7, 2014, which claims the benefit of U.S. Provisional Application No. 61/767,314, filed on Feb. 21, 2013 and U.S. Provisional Application No. 61/868,111, filed on Aug. 21, 2013. These applications are hereby incorporated by reference herein.

FIELD OF THE INVENTION

The invention relates to apparatuses and methods and resulting products like data storage products or encoded signals, e.g. as stored in memories, for improved encoding of at least one image or video with an increased dynamic luminance range compared to legacy images called low dynamic range (LDR) images.

BACKGROUND OF THE INVENTION

The newly emerged field of High Dynamic Range (HDR) imaging contrasts itself with legacy systems, which nowadays by comparison we can call low dynamic range (LDR) imaging (an which comprise such image or video encoding systems like PAL or MPEG2, AVC, HEVC or another member of the MPEG family, or similar video standards like e.g. VC1, VC2, etc., or JPEG for still pictures etc.)

When talking about HDR, we need to look at the various components of the chain. As this is a very recent area of technology where perhaps not everybody is on the same line, we want to quickly set a reference mindset with a couple of important definitions, to avoid misunderstandings. Ultimately there is the rendering dynamic range, which the display medium can generate. Rendering dynamic range is usually defined as RDR=brightest_white_luminance/darkest_black_luminance of all pixels in an image (intra-picture RDR) or of pixels in successive images (inter-picture RDR, e.g. when the display is (nearly) switched off, and one only sees the reflection of the surrounding environment on the front glass). However, it is more meaningful when also coupled to a peak_white value (i.e. the brightest_white_luminance value). LDR renderers usually lie in or around a range defined by peak_white of 100 nit, and a dynamic range of around 100:1. That is what a CRT display might have produced, where of course the darkest_black_luminance strongly depends on the viewing environment illumination, so one may go for 40:1 to be on the safe side, and also 2:1 can be a practical dynamic range when one views images on a display under the sun. The viewing environment which conditions the human viewer brightness adaptation is related to that, e.g. typically 20% of peak_white. Several standards of EBU, SMPTE etc. specify how one should grade a video signal so that it can be used in a standard way, e.g. it is optimal if shown in the prescribed viewing environment. By grading we mean producing an image with changed pixel colors, which are changed/specified according to some preference. E.g., a camera can automatically grade a RAW camera picture (which is just dependent on the camera specifics as a linear luminance measuring instrument) given a rendering intent into a directly usable display-referred encoding, with which one can steer e.g. such a CRT display under reference conditions so that it will show a neat picture to the viewer.

Oftentimes grading by a human involves more artistic choices. E.g. the grader wants to make the color of a plant a nice purplish color, but this needs to be specified under reference conditions (both of the display technology and the viewing environment, and in theory also other conditions affecting the state of the viewer like medicament uptake, but of course one typically ignores those largely), because a particular display may make this color more bluish, in which case the desired artistic effect (of creating a beautiful picture) may be gone. It is not typical that a camera automatically creates the optimal kind of purple, so that is why the grader does that with image-processing software. Such a grader can be both a photographer, or a visual artist working on a movie, or even somebody working on a (potentially even life) television program. Of course various applications will have various degrees of grading complexity linked to the desired technical and/or artistic quality for those applications. Typically the above standards prescribe that a grading shall be done on a reference monitor of around 100 nit in a reference environment. The question is then how a color will be rendered and perceived in practice. Graphics artists for printed press publications also generate their work under reference conditions to have some common ground, and avoid needless sources of error e.g. at the printer's. However, that doesn't mean of course that each reader of the book or magazine will read the book under a calibrated D50 lamp, but rather he may perceive more dull colors when reading in his bed under bad illumination. The same happens when a movie or television program, or a consumer photo, is shown on a non-reference display from among the many different displays that are available nowadays. E.g., the image (grading) may be shown on a 500 nit peak_white display. What happens then is that one brightens all pixel colors by at least linear stretching, which occurs by driving the display with the grading, i.e. mapping maximum white (e.g. value R=G=B=255) to the peak_white of the display (of course there may be further brightness deformation for the various image pixel colors if the display has a special native electro-optical transfer function EOTF, but usually that is handled internally to make the display behave like a brighter version of a reference CRT, i.e. with a display gamma of around 2.5).

Now such standardized (produced in a reference environment inter alia on a 100 nit reference display) LDR gradings can be used (i.e. look reasonably good, i.e. still reasonably similar to how they would look under reference conditions) on a range of display and/or environment conditions around the reference display system (i.e. 100 nit peak_white etc.). This is because most humans are not so supercritical about the exact (absolute) look of colors since the brain works relatively (e.g. depending on the criteria for allowability, face colors which are one of the more critical colors may vary from paleish almost white, to quite orangeish, etc., before the less critical larger part of the population starts to object), but also because for many objects nobody knows what the original colors in the scene were. Partially this is also so because LDR scenes are made with an "around the average" object color strategy (which is realized inter alia with well controlled studio lighting, maybe not always so anymore with the various on-the-fly content we have now), which means all colors are vivid, one may even brighten the image somewhat to above the 18% level, with some shadows but not too deep or important etc., and that reproduces both physically and psychologically rather well on various systems. It is e.g. how naïve painters work before they discover such complex issues like clair obscure etc. So depending on the quality criterion defining acceptable similarity, the LDR_100 nit grading may be used e.g. on displays from 30 nit up to 600 nits, and viewing environments from 3× less bright to 5× more bright. The latitude for using a grade can be increased by modifying it with a so-called display transform. The brightness of a display and surrounding (related to Stevens effect and Bartleson_Brenneman effect) can be corrected to a reasonable degree far more easily than issues related to display gamut constraints, and one typically can process the picture with gamma functions or similar. E.g. when moving a display from a dim surround to a dark surround (or in fact switching off the cozy living room viewing lights), one changes from an extra gamma of 1.25 to 1.5 i.e. one uses the residual gamma to increase the contrast of the rendered images, because human vision is more sensitive in the dark hence perceives the blacks of the rendered image as more grayish, which amounts to a reduction in perceived contrast which has to be compensated. A similar LDR technology is printing. There of course one does not have a priori control over the surround illuminance determining the peak white of the print, but at least, just as with all reflective objects, the white-black RDR is about 100:1 (depending on paper quality, e.g. glossy vs. matte, inks, etc.).

A complication arises when one needs to reproduce an image of a scene with huge dynamic range, and typically also scene conditions very unlike the rendering conditions. E.g. in a night scene they eye may be looking at a scene dynamic range SDR between car lights of 100.000 nit (or e.g. even more for a high pressure sodium or mercury lamp in the scene) versus dark regions in shadows of fractions of a nit. Even in daylight, where it may be more difficult to create dark shadows from the all-pervasive illumination, indoors it may typically be 100× darker than outdoors, and also dark clouds, forrest cover, etc. may influence needed luminances (whether captured or to be rendered), if not in intra-scene, then at least in inter-picture i.e. temporally successive reproduction. Quotes for the "native dynamic range" of human vision vary between 10.000:1 and 100.000:1 and even 1.000.000:1, because this depends of course on the conditions (e.g. whether one needs to see a darker small region in the brights, or vice versa whether one can see some bright small object in the dark, be it perhaps partially rhodopsin-bleaching; whether one considers an amount of glare discomforting, etc.; and then there is of course also a psychological factor [taking into account such things as importance of certain objects, their perfect or sufficient visibility, emotional impact on the viewer, etc.], leading to the question how much of that should be rendered on a display [e.g. a viewer may quickly discard an area as "just black" without caring which black exactly], given that the viewer is in a totally different situation anyway [not really on holiday, or not really interrogated by a police officer shining a light in his face], but one wants a certain amount of realism which may further be a trade-off with other factors like e.g. power consumption, so one could pragmatically in fact define several human vision dynamic ranges, e.g. one for a certain type of real scene viewing, and one for television viewing). E.g. if one is adapted to the dark night sky, but sees the moon in the corner of the eye, that has less influence on how the rods in other places of the retina can see the faint stars, i.e. "simultaneous" viewable dynamic range will be high. Conversely when the eye is bathed in strong daylight (over a large area of its field of view) it is more difficult to discriminate the darker colors in a darker interior seen and illuminated through a small hole or window, especially if a bright source is adjacent to that dark area. Optical systems will then show several glare phenomena. Actually the brain usually may not even care about that dark interior, and just call all those colors psychological blacks. As another example of how the leakage of light influences and determines scene dynamic range from the perspective of a human viewer, consider a badly illuminated dark bush in the night behind a light pole. The lamp on the light pole creates a light scattering profile on the scratches of the glasses of the viewer (or if he doesn't wear glasses the irregularities in his eye lens, e.g. submicron particles, water between cells, . . . ), in particular as a halo around the lamp which reduces the discrimination possibility of the dark colors of the bush behind it. But when the viewer walks a couple of seconds the lamp moves behind him outside the capturing zone of the eye lens, and the eye can quickly adjust to find the predator lurking in the dark.

So however one defines the useful dynamic range of a scene for encoding and rendering for human consumption (one may even consider not to only encode the intra-picture luminances with a global lightness scaling factor, but the actually occurring luminances from a sunny tropic environment to the darkest overcast night), it is clear that far more than 100:1 is needed for faithful or at least plausible rendering of these environments. E.g. we desire our brightest object on a display for dim surround to be around 10000 nit, and our darkest 0.01 nit (or at least 0.1 nit), at least if we could e.g. dim the lights in case we have fully or mostly dark scenes in the movie or image(s).

This is where HDR comes in. And also, when one captures such a scene it needs very complex mathematical mapping to approximate it (or even be able to render it) on an LDR display (this in fact oftentimes being not really possible). E.g. some HDR-to-LDR mapping algorithms use local adaptation to kind of equalize out the illumination field leaving in the LDR rendering mostly an impression of the object reflections i.e. colors. In view of the leakage (multiple reflection, scattering, etc.) of light from brighter to darker parts of a scene it is not easy to create extremely high dynamic range scenes, but an illumination difference of 100:1 can easily be achieved in many practical situations. E.g. an indoors scene may have (of course dependent on depth of the room, size and position of the windows, reflectivity of the walls, etc.) a fraction or multiple of about $\frac{1}{100}^{th}$ of the outdoors (il)luminance (which is also how the daylight factor of building lighting is defined). Higher SDRs can be obtained when watching a sunny outdoors from within a cave through a small crack, etc. Also on the display rendering side, a HDR range starts where one starts seeing new appearance concepts. E.g., on bright displays like a 5000 nit SIM2 display, one can given the right input pictures (rightly graded) realistically render impression of real switched-on lamps, or real sunny landscapes. In distinction with the above LDR range, we may typically say that HDR starts for normal television living room viewing conditions from around a 1000 nit peak_white and above, but more precisely this also depends on the exact viewing conditions (e.g. cinema rendering, although with a peak_white of 50 nit, already shows quite some HDR appearances). To be even more precisely in view of eye and brain adaptation the HDR-ish look in numerical detail would also depend somewhat not just on the physical luminances but also the image content, i.e. the chosen grading. But in any case there is a clear discrimination between LDR rendering which mainly shows a dull, lightless version of the scene, as if it was nearly illuminated homogeneously and just showing the object reflectances, and HDR, in which a full lighting field appearance is superimposed. If you can then render reasonable blacks, e.g. 1 nit or below, you can indeed get above an LDR contrast range of k×100:1, where k is typically 2-3 (which under a particular paradigm of near-similar, i.e. with only perhaps a small contrast stretch, relative rendering of the displayed luminances compared to the scene luminances would correspond to a similar DR in the scene). On the high end of brightnesses it is partly a matter of taste where the brightness should end, in particular where further brightness only becomes annoying. We found that to grade several kinds of HDR scene 5000 nit is still somewhat on the low end, in particular when having to deal with further display limitations like backlight resolution. In experiments we found that definitely one can go to 10000 nit in dark viewing without the brightness getting superfluous or irritating (at least to some viewers). Going above 20000 nit peak_white it may be a practical technical design consideration of what to render true-to-life luminance-wise, and what to approximate, giving at least a brightness appearance. Note that one typically should not drive such a bright display always at maximum brightness, rather to make an optimal HDR experience one should only use the brightest rendering at certain places and times, conservatively, and also well-chosen as to their temporal evolution. One should not only focus on intra-picture DR, but also on how different brightness environments are to be rendered in succession, taking human visual adaptation into account.

Another dynamic range is the camera dynamic range CDR, which is just (given the exposure settings) determined by the full well of the pixel's photodiode, and the noise on the dark side. When using tricks like multiple exposure or differently exposable pixel arrays (e.g. in 3 chip cameras), the CDR becomes limited by the optics (e.g. lens scattering, reflection on the lens or camera body, etc.), but also this can be improved by suitable computational imaging techniques which try to separate the real illumination from dark scene regions from erroneous irradiation due to stray light. Of course when the source of the image is a computer graphics routine (like e.g. in special effects or a gaming application) one can easily create HDR far beyond those limitations. We will ignore the CDR, and just assume it is either very high, or perhaps a limiting factor but in a system which is supposed to handle situations of very high originals. In particular, when we introduce clipping we will assume it is not due to a low quality camera capturing, but due to a practical handling of some other limitations in the entire imaging chain, like the inability of a display to render very bright colors.

Now apart from the display environment RDR, which does actually generate the right photon distribution to stimulate the viewer into the right sensation (be that also dependent on the adaptation state of that viewer), when talking about handling or coding HDR, there is another interesting aspect, which can also be summarized in a dynamic range, which we shall call coding dynamic range CODR. A couple of thought experiments should clarify this important concept. Suppose we were to draw on a bright back-illuminated white panel with a highly absorbing black marker, so that we would get a transmission of $1/16000^{th}$ of the surrounding white of the panel (and assuming the surrounding room and viewer are perfectly absorbing objects). In the linear bits world (by which we mean that we linearly represent all values between say 0 and $2^B$, where ^ is the power operation and B the number of bits) of e.g. the camera capturing (its ADC) we would hence need 14 bits for representing this signal. However, as this codec would waste a lot of codes for values which don't occur anyway, we can say that to faithfully represent that particular signal, we theoretically only need a 1-bit encoding. We would give black the code 0, and white the code 1, and then convert them to whatever actual luminance they correspond to. Also note that a display need not in fact render those values with exactly the same luminances as in the scene. In fact, since this signal may look no better (psychologically and semantically) than a lower DR equivalent thereof (actually such a high contrast black and white drawing may even look weird), we might as well render it on a display with values 1 nit and 2000 nit. We see here for the first time an interesting distinction which is important when talking about HDR encoding: the difference between physiological and psychological (or semantic) dynamic range. Human vision consists of two parts, the eye and the brain. The eye may need as a precursor the appropriate physiological dynamic range PDR to appropriately stimulate cones and/or rods (and thereby ganglion cells etc.), but it is ultimately the brain that determines the final look of the image or scene (psychological dynamic range PSDR). Although it doesn't quite give the exact impression of a very luminous region, painters like Petrus Van Schendel can play on the PSDR psychological principles to emulate in an LDR medium high dynamic range scenes like e.g. a fire in a dark night cityscape. This is also what complex gamut mapping algorithms try to do when preconditioning a HDR image for rendering on an LDR display. But the other side of this principle is that some scenes will look more HDR-ish even on a HDR display than others (e.g. a sunny winter landscape with pale dried shrubs and some trees in the back may look high brightness but not so HDR). For HDR actions, like e.g. turning a bright lamp towards the viewer, psychological emulations are usually not so convincing as the real bright rendering of the regions.

Consider along the same lines now a second example: we have an indoors scene with luminances of say between 200 nit and 5 nit, and an outdoors scene with luminances of say between 1500 and 20000 nit. This means that again we have two luminance histograms separated by non-existing codes. We may natively encode them on a range of say 16 linear bits (the maximum code e.g. corresponding to 32768 nit), although it would be preferable to use some non-linearity to have enough accuracy in the blacks if there's not too much capturing noise. But we could also encode this in a different way. E.g. we could sacrifice 1 bit of precision, and divide an 8 bit nonlinear JPEG luma range in two adjacently touching parts, the below one for the darker part of the above scene, and the upper one for the lighter (one may not want to cut exactly in the middle in view of the non-linear JND allocation). If one is concerned about loss of precise detail when having less bits, one may consider that it may often be better to use available bits instead for HDR effects. Such an allocation would typically correspond to a shifting and (non-linear) stretching of the luminance (L) values of the input RAW capturing to the 8 bit luma (Y) values. Now one can again ask oneself the question of what a dynamic range of such a scene is, if it can be "arbitrarily" compressed together or stretched apart (making the brighter outside even brighter, at least until this becomes e.g. unrealistic), at least in post-processing for rendering. Here the concept of different appearances can help out. We have in both subhistograms a number of different luminance values for different pixels or regions, which assumedly are mostly or all relevant (if not, we don't need to encode them, and can e.g. drop one or more bits of precision). Also the separation (e.g. measured as a difference in average luminance) of the two histograms when ultimately rendered on a display has some appearance meaning. It is known that human vision to some extent discounts the illumination, but not entirely (especially if there are two brightness regions), so one needs to render/generate those eye inputs to at least a certain extent. So working with meaningful different color (or at least brightness or lightness) appearances of pixels or objects in a renderable scene (e.g. when rendered in the best possible display scenario) gives us an insight about the coding dynamic range CODR, and how we hence need to encode HDR images. If the image has many different appearances, it is HDR, and those need to be present somehow in any reasonably faithful encoding.

Since classical image or video encoding technologies (e.g. PAL, JPEG, etc.) were primarily concerned with rendering mostly the object (reflection) lightnesses in a range of 100:1 under originally relatively fixed viewing conditions (a CRT in a home environment, and not an OLED in the train, or the same consumer having in its attic a dedicated dark cinema room with on-the-fly dynamically controllable lighting, which can adjust to the video content), those systems encoded the video in a rather fixed way, in particular with a fixed universal master encoding gamma which mimics the brightness sensitivity of the eye, like e.g. V_709=1.099L^0.45-0.099, which is approximately a square root function. However, such systems are not well-adapted to handle a vast range of CODRs. In the last couple of years there have been attempts to encode HDR, either in a native way of scene-referred linearly encoding all possible input luminances, like in the OpenEXR system (F. Kainz and R. Bogart: http://www.openexr.com/TechnicalIntroduction-.pdf). Or, there are 2-layer systems based on the classical scalability philosophy. These need at least two images: a base image which will typically be a legacy-usable LDR image, and an image to reconstruct the master HDR image(s). An example of such is US2012/0314944, which needs the LDR image, a logarithmic boost or ratio image (obtained by dividing the HDR luminances by the LDR luminances obtained after suitably grading an LDR image for LDR rendering systems), and a color clipping correction image per HDR to-be-encoded image. With a boost image one can boost all regions (depending on subsampling) from their limited range to whatever luminance-position they should occupy on the HDR range. Note that for simplicity we describe all such operations in a luminance view, since the skilled person can imagine how those should be formulated in a luma view of a particular encoding definition. Such multi-images are at least the coming years somewhat cumbersome since they need seriously upgraded (de)coding ICs in existing apparatuses, since the handling of further images in addition to the LDR image is required.

Recently and as described in WO2013/046095 we have developed a way to improve the classical video encoding (preferably with minor modifications, preferably with mostly metadata to apply transformations relating two gradings of the same scene for two very different rendering conditions, such as e.g. allowing to transform an encoded LDR grading in a HDR grading or vice versa, and perhaps with some variants having room to store in the metadata a couple of additional small pictures to do a final tuning if such a further modification is desired, e.g. an additive or multiplicative correction on a small regions containing an object like e.g. a very brightly illuminated face in one shot or scene of the movie, in which the corrective factors per pixels may then be encoded e.g. in 200 120×60 pixel images to be mapped onto the pixel positions of the current HDR reconstruction by color transformation, or even some sub-sampled representation of those small corrective images, to be applied as coarse finetuning mappings, described as images) to be able to encode high dynamic range images. In this system typically a human grader can determine an optimal mapping function from the input HDR image (master HDR grading) to a e.g. 8 or 10 (or 12 or in principle another value for at least the luma codes, but this value being typically what is reserved for "classical" LDR image encoding) bit LDR encoding which can be encoded through classical video compression (DCT etc.), the optimal mapping function (e.g. a gamma function or similar with optimal gamma coefficient, linear part etc., or a multi-segment function like e.g. an S-curve etc.) typically depending on what the content in the master HDR was (e.g. a dark background, with a very brightly lit region), and how it will be rendered in LDR conditions. We call this simultaneous encoding of an LDR and HDR grading by mapping the HDR grading into a legacy-usable LDR image and LDR-container encoding of HDR. We wanted to make sure in this technology, that it was backwards compatible, in that the so-generated LDR image gives reasonable results when rendered on a e.g. legacy LDR system (i.e. the picture looks reasonably nice, if not perfect typically not so that too many people will consider the colors of some objects all wrong). If one accepts somewhat of a diminuation of precision, our system can even encode HDR scenes or effects on legacy 8 bit systems. With reasonable results we mean that the LDR rendered images, although perhaps not the best one theoretically could achieve artistic look-wise, will be acceptable to a content creator and/or viewer, this depending of course on the application (e.g. for a cheaper internet-based or mobile service quality constraints may be less critical). At least the LDR grading will give good visibility of most or all objects (at least the objects of main importance for the story of the image or video) in the imaged scene when rendered in an LDR system of properties not deviating much from standardized LDR rendering. On the other hand, for HDR displays, the original master HDR can be approximated in a close approximation by mapping with the invertible reverse of the co-encoded mapping function from the LDR image to the reconstructed HDR image. One can define such an approximation with mathematical tolerance, e.g. in terms of just noticeable differences (JNDs) between the original master HDR inputed, and its reconstruction. Typically one will design any such a system by testing for a number of typical HDR scenes, actions, and further situations how much different the reconstructed HDR looks (if that is still acceptable for certain classes of users, like e.g. television or movie content creators) and validate a class of operations like particular gamma mappings within certain parameter ranges therefrom. This warrants that always a certain quality of the approximation can be achieved.

It is an object of the below presented technologies to give the grader even more versatility in defining at least two gradings, LDR and HDR.

SUMMARY OF THE INVENTION

The above object is realized by having an image encoder (202) comprising:
an input (240) for a high dynamic range input image (M_HDR);
an image grading unit (201) arranged to allow a human color grader to specify a color mapping from a representation (HDR_REP) of the high dynamic range input image defined according to a predefined accuracy, to a low dynamic range image (Im_LDR) by means of a human-determined color mapping algorithm, and arranged to output data specifying the color mapping (Fi(MP_DH)); and an automatic grading unit (203) arranged to derive a second low dynamic range image (GT_IDR) by applying an automatic color mapping algorithm to one of the high dynamic range input image (M_HDR) or the low dynamic range image (Im_LDR).

One will typically make the GT_IDR grading from either the high dynamic range image (typically master grading) or the LDR grading, but of course it may also be advantageous to take into account therewith the image characteristics, in particular the brightness or lightness look of various object, of the other grading (i.e. what the LDR grading should look like if we map GT_IDR from M_HDR, so that the GT_IDR may be some kind of balance, but of course it may be formed by all kinds of other side conditions/factors too). We assume that the master HDR image is encoded in any format allowing such an encoding (e.g. this may be OpenEXR, or a system as elucidated with our FIG. 7, in general anything preferred by e.g. the maker of the grading software). I.e. the M_HDR encoding may be of a linear, scene-referred type, or already have some interesting code allocation function applied to it, but for our explanations we could safely assume it to be a linear luminance encoding. Typically such a master HDR image will not be straight from camera (as cameras being just automatic capturing tools, with characteristics like e.g. color filters not like to human eye, but more importantly their circuits not like the human brain, what comes out of them by mere recording may be good but not necessarily optimal), but an artistic optimal grading (which e.g. darkens a basement background environment to create an optimal mood for that scene), however, the human grading could be a simple functional mapping of the image of a camera somewhere (this then being the master HDR input), e.g. just to get a first view on a certain renderer, after which a high quality HDR image is encoded (via an LDR image and mapping parameters). An image grading unit is typically software running on a computer, which allows color mapping from initial colors of pixels to final colors of pixels, e.g. changing a luminance-correlate of those pixels from an initial to a final value by e.g. applying a tone mapping function (e.g. an S-curve) on that luminance-correlate or e.g. color defining curves (like R,G,B) simultaneously. The skilled person should understand why we use the term luminance-correlate to denote any mathematical encoding correlating with a luminance of a pixel (when captured in a scene, or rendered on a rendering thereof), since given the complexity of color technologies, there exist several similar variants thereof, like lumas, values (V), functional definitions for correlates called lightness, etc. In fact a linear or non-linear component of the color, like an amount of red, can also be used as a luminance-correlate. So luminance-correlate should be understood as any monotonous mapping function between the luminance axis (luminance as defined by the CIE) and another axis, so that any value on that other axis can immediately be converted into a luminance value and vice versa. Although the formulations for various correlates vary in their precise details the principle stays the same. But we introduced the term also to indicate that although the principles of our embodiments can be defined on luminance mappings, they may actually be physically constructed by doing mathematics on other luminance-correlates, or in general any color encoding. The human color grader may e.g. be directed partially by the director of a movie to produce a certain look for the captured movie.

The principle of the above embodiment is that, contrary to legacy systems with a fixed mapping function relating an LDR and HDR grade (e.g. encoding any input image, whether it has an increased dynamic range or not, into an LDR encoding), we now have a dual system. This will typically also create two sets of mapping parameters (e.g. luminance-correlate mapping functions, or in general data defining software-realized mathematical transforms to transform the input colors in the output colors) instead of only one reversible function to create the to be rendered image (in case of PCT/2012/054984 an HDR reconstruction to be used on an HDR display for driving it, directly or after further color processing).

In this dual system there are also two gradings relatable to the master HDR. Firstly, there is an automatic grading, which creates a good quality first LDR image, which we call the second low dynamic range image GT_IDR. It may be (partially) influenced by the color grader (e.g. by selecting a preferred one out of a set of mapping function which normally would yield good results on all input images), but typically it is advantageous if this automatic grading appears behind the scenes in the apparatus, out of view and concern of the grader who can then focus on his artistic desires. The point of this technical grading is to create an image GT_IDR which, although perhaps not fully optimal according to the grader's particular artistic desires, produces a well-viewable LDR image when rendered on an LDR system (well-viewable again meaning not just that any image will come out, but that the viewer can follow most of what is happening in the movie, because visibility of all objects is good, although due to some discoloration compared to the optimum the mood of the scene may be altered somewhat). But mostly it defines its mathematical derivation so that this second LDR image GT_IDR is technically optimal, in that it is easy to reconstruct from it a reconstruction REC_HDR of the master HDR with optimal quality. This means that the information loss in GT_IDR due to e.g. quantization after using the particular optimal mapping to it from M_HDR should be minimal, so that there is a minimal acceptable amount in the reconstructed HDR for all typical possible HDR input images.

Then on the other hand there is an artistic grading of the human grader. He can derive whatever picture he wants according to his preferences to see for LDR rendering systems. E.g., we may have an action happening in a dark basement in a horror movie. The HDR rendering system may be able to render the dark surroundings very dark while still retaining the visibility of most objects (e.g. torturing equipment on shelves in the shadows against the wall, or the interior of an unlit adjacent room behind an open door). And at the same time it may be able to render very bright objects, like a single light bulb oscillating on the ceiling of that dark room, or a torch in the hands of a person walking through it. However, the LDR rendering system may have lesser capabilities for rendering the dark surroundings, in particular because it also needs to make room in its limited luminance range for the brighter objects like the light bulb and the face of the person walking under it, and the grader may want to emulate the brightness by increasing the contrast with the luminances of the surrounding objects, i.e. the dark background. The grader may e.g. artistically decide to make this background entirely black for the LDR grading Im_HDR. It should be clear that this low dynamic range image Im_HDR can then not be used for reconstructing a REC HDR with enough information in the background to have all objects there visible. As a generalization of this, it can be seen that the automatic grading unit must make sure no relevant information loss occurs, so that a HDR reconstruction can still be derived with good approximation accuracy from the GT_IDR encoded LDR image. Note that this LDR image GT_IDR need not perse be defined with the same environmental constraints (e.g. 100 nit peak white of intended display), but it may also be e.g. for a 200 nit reference display.

As the skilled person can understand, there are two ways to realize such a system. Either the technically grading automatic grading unit does its mapping first, and then the human grader works on that GT_IDR to create his preferred LDR grading IM_LDR, or the human grader first does his grading Im_LDR, and then the automatic grading unit derives therefrom a technically more suitable GT_IDR for encoding all relevant HDR data in an LDR_container format. So in fact this logically corresponds to that the human grader will in both cases work on representation of the master HDR. In the human grading first case it will be the (infinitely accurate) master HDR itself which forms the starting point. In the second case the resultant GT_IDR from the automatic technical grading will be a good representation of the master HDR, since it contains most (at least the relevant) data of the master HDR, be it in a mapped, different luminance-correlate representation (e.g. a luminance of a lamp of 10000 nit in the master HDR may be represented as a luma code 253 in the GT_IDR). According to a predefined accuracy again means that one puts technical bounds on how much a reconstruction REC_HDR from the GT_IDR may deviate from the originally inputted M_HDR. Typically the skilled person knows one can (if not solely defined according to human panel preference) mathematically characterize such deviations e.g. by means of weighted difference between the pixel colors of the REC_HDR and the M_HDR. E.g., one may use mathematical functions which characterize a difference following human visual principles, e.g. looking at colors in regions, and e.g. penalizing differences less if they occur in textured areas, etc. One can allow larger differences to some semantical objects like e.g. lamps, since the actual rendered luminance for those objects may be less important. In summary the skilled person will understand that typically the technical grading will do any of a set of pre-agreed mappings, which for any or most of the typically occuring input M_HDR images will yield reconstruction errors below a certain threshold (which can either be a subjective agreed value by the human evaluation panel, or an agreed mathematical value). Typically the will be e.g. a set of gamma-like functions (i.e. typically starting with a linear part in the blacks, and then bending to show ever descreasing slope of the output versus the input), or parametric three-segment curves for affecting the darks/shadows, mids and brights subranges of the luminance or luminance-correlate axis, which all behave reasonably, and some may give lesser reconstruction errors in a particular luminance region of a particular type of M_HDR. The human grader may then select such a curve. Or alternatively, the automatic grading unit may select such an optimal curve by e.g. looking at the color or luminance histogram of the M_HDR, or doing a more complicated analysis thereon (e.g. determining where the face(s) are). So representation HDR_REP of the M_HDR according to a predefined accuracy means that this image contains substantially all the data of M_HDR, be it in a differently encoded way, so that one can reversly re-obtain the inputed M_HDR within a predefined accuracy, i.e. with reconstruction errors worst-case typically not exceeding an agreed level.

So the human grader hence works either on the M_HDR, or on the GT_IDR to obtain his preferred low dynamic range image Im_LDR to be used for LDR rendering systems. He may use any color mapping from a set of available mappings in the grading software he decides, e.g. he may taylor a specific global tone mapping (i.e. luminance mapping) or color mapping function to be applied on all pixels at whatever spatial position in the image based solely on their input color value. Or he may use locally finetuned mappings. E.g. he may in a particular geometrical region of the image (e.g. specified within a rectangular or otherwise defined bounding shape) select only those pixels which are brighter than a particular luma value (or within a ranges of specified colors) and transform only those pixels according to a local color mapping strategy, etc. He will then write all the things he did as metadata, e.g. the global luminance-correlate changing function can be written in a parametric form (e.g. power function coefficients for three regions of an S-like curve, like and end point of the shadows, linear parts on either side, a parabolic curvature coefficient, etc.). If these functions are (largely) reversible, the receiving side can then use those to reconstruct back by using this output image as an input image and using the inverse color mapping strategy, the original image that this output image was obtained from, at least within a certain accuracy (after e.g. quantization and/or DCT artefacts etc. have been introduced).

In the human grading first embodiments, the human grader will produce the mapping parameters Fi(MP_DH) from the M_HDR mapping. However, since the automatic grading will still modify the LDR grading, these are not the interesting parameters in the end. The automatic grading unit will derive therefrom two sets of new parameters. It will derive a different mapping from HDR to the new LDR grading being GT_IDR, with mapping parameters Fi(MP_T). It will also derive new mapping parameters Fi(MP_DL) to create the human-preferred LDR grading Im_LDR from the technically graded second LDR image GT_IDR. When storing the data needed for a receiving side to work on the encoded M_HDR image, i.e. in particular allowing the receiver to recreate a reconstruction REC_HDR, a formatter will typically encode the GT_IDR (for the texture of the objects), and two sets of mapping data Fi(MP_T) and Fi(MP_DL), into a suitable encoding defined in the specification of any signal standard, i.e. typically in metadata of the image (or video) signal TSIG. In case of the automatic grading first, the human grader will work on GT_IDR to produce mapping parameters Fi(MP_DL), and then these will be written into the signal (in addition to the GT_IDR image and Fi(MP_T)).

Depending on which variant the system is, the automatic grading unit will then either apply as a prespecification the second LDR image GT_IDR directly from the master HDR M_HDR, or as a postcorrection based upon a priorly human graded Im_LDR as input. The term data specifying a color mapping should be clear to the skilled person for any of the many possible variants of color mapping. Typically the grading software may store the parameters of the functions it uses, and in particular it may use mapping functions which are preconditioned to be good for encoding. E.g. we can design a number of local or global functions which are reversible (within a specified accuracy) when used conservatively, i.e. with values within a range, and may become (partially) irreversible when used agressively by the grader. An example of such may be a gamma function. Gamma coefficients up to a value of 3.0 may be seen as reversible for a particular system (i.e. going from a particular initial dynamic range, e.g. CODR, or e.g. with significant important data in several subranges of a 5000 nit-defined reference range, to a particular LDR reference situation, e.g. a legacy LDR system definition e.g. the viewing environment specification of sRGB), but gammas above 3.0 may be seen as to severe for at least a subrange of the input luminance range (i.e. for reversible reconstruction). Or in an extended set to produce a posteriori LDR gradings from the automatic GT_IDR, there may be functions which do not exist in the automatic grading, and create significant information loss on the input HDR information upon creating a desired graded LDR image therewith. The system may typically work in a mode or phase were the grader has a limited freedom to create LDR images, but with good technical properties (i.e. close to a well-functioning GT_IDR), and a mode or phase in which the grader has (near) unlimited freedom, or at least greater freedom in determining his optimal LDR graded image Im_LDR.

In advantageous embodiments the automatic grading unit (203) is arranged to determine its automatic color mapping algorithm by fulfilling a condition that a HDR reconstructed image (REC_HDR) falling within a second predefined accuracy from the high dynamic range input image (M_HDR) can be calculated by applying a second color mapping algorithm (CMAP_2) to the second low dynamic range image (GT_IDR).

So the automatic grading unit will maintain the quality of the second LDR image GT_IDR to enable good reconstruction of the master HDR. It will fulfill this condition by constraining the functions that can be used to relate the M_HDR with the GT_IDR. In particular, not too much (significant) data should be lost by such acts as e.g. quantization of color components like e.g. (R,G,B) or (Y,Cr,Cb), etc. So it will typically select its mapping functions based on such an evaluation, whether this was an a priori calculation (e.g. by an algorithm which is pretested in the lab so that when it operates on HDR images with e.g. certain luminance histogram distribution properties it will yield good reconstructability for certain mapping functions or algorithms), or with a post-calculation, e.g. in an iterative loop selecting the best of a number of possible mapping functions. The second predetermined accuracy is the final accuracy achievable by reconstructing the REC_HDR from the data encoded with the chosen mapping algorithm, i.e. by applying the inverse of Fi(MP_T) on the GT_IDR, which inverse we call second color mapping algorithm CMAP_2. For the automatic grading first embodiments this will mean that the automatic grading unit will solely determine the mapping between M_HDR and GT_IDR (and the user need in fact not be bothered with that relation). It will then select e.g. an appropriate gamma function, so that the GT_IDR still has a reasonable approximation to the darkish look in the M_HDR, yet, none of the relevant luminance values are clustered together in one luma of GT_IDR too much. In the situation of the human-first grading, the automatic grading unit still has to determine a final mapping Fi(MP_T) between M_HDR and GT_IDR. This corresponds to redetermining a new second LDR graded image GT_IDR after the human grader (but this will not destroy the human grading, since mapping parameters for reconstructing it from GT_IDR are also determined). Several strategies can exist for that. E.g., the automatic grading unit can look at the mapping function, and deviate it somewhat in regions which lead to severe data loss, e.g. due to quantization. Thereto the automatic grading unit could study the obtained images (Im_LDR vs. GT_IDR as compared to M_HDR) but also the mapping curve itself (by seeing how much it deviates from generically well-performing mapping curves). Another possibility is that the automatic grading unit selects one of a set of mapping functions which is close to the one selected by the human grader, yet well-performing. From thereon it is mathematical calculation to obtain the final system. E.g. GT_IDR will be obtained by applying a deviation function on the human graders M_HDR-to-Im_LDR mapping function Fi(MP_DH). Actually, the automatic grading unit can then apply this final function directly to M_HDR to obtain GT_IDR, directly with minimal error. Im_LDR can be derived therefrom by using the deviation function. The skilled person understands how similarly in other mathematical frameworks the automatic grading unit can determine an optimal mapping Fi(MP_T) and corresponding therewith a mapping from the GT_IDR to the grader's Im_LDR (i.e. Fi(MP_DL)). We have schematically shown this in FIG. 6 as applying a technical deformation DEF_TECH to the grading of the human grader, to obtain the technically graded LDR image GT_IDR. I.e. the automatic grading unit can work either starting from the LDR image Im_LDR and work in a deformation philosophy, and derive therefrom Fi(MP_T), or it can directly look at the look of the human grading Im_LDR, and make an approximation thereof starting from M_HDR, given the technical limitations of its technical grading, leading to a Fi(MP_T), and determine therefrom an Fi(MP_DL) to derive the human grading from GT_IDR (which mapping may then be very liberal technically), etc. So it should be clear for the skilled person in which ways the condition can and will be fulfilled. Again the accuracy can be predefined as any measure, e.g. for a quality class of technology (e.g. high quality movie for premium users vs. low quality HDR encoding giving mostly the impression, but not the ultimate quality), e.g. specifying that certain mappings will on difficult case HDR image create artefacts which are no larger than artefacts of a pre-agreed magnitude. Other mapping strategies which do not behave according to specification should then not be used. In any case, apart from minutely accurate details in definitions, it should be clear for any infringer whether he is using the dual grading technical chain system as described above.

As already introduced above, it may be advantageous if at least the automatic grading unit (203), and possibly also the image grading unit (201), are arranged to apply a monotonous mapping function on at least a luminance-correlate of pixels in their respective input image, in at least a geometrical region of the respective input image corresponding to a same geometrical region of the high dynamic range input image (M_HDR). Having such a one-to-one functional definition in uniquely identifiable regions of the image (e.g. the entire image), means that at least on an infinite precision axis one can easily invert these functions. It is especially advantageous if also the derivatives or slopes of these functions are so that they do not merge many of the M_HDR luminances into a single code of Im_LDR or at least GT_IDR. Also such monotonous functions are easy to calculate technically, e.g. with a lookup table. E.g. this may take a luminance-correlate such as a luma Y as input and output. An example of an often-occuring HDR scene which can be done with two spatial regions is an inside-outside image, e.g. photographed from inside a car, or room, etc. With geometrical regions corresponding to we mean that if the region is defined on say the Im_LDR, then the pixels are identifiable with pixels in M_HDR. E.g. if the image has the same geometry (resolution and cut), the pixel positions may collocate, but in case of geometrical transformations like e.g. scalings it should also be clear what is meant to the skilled person.

Although simple systems may e.g. use fixed, pre-agreed, always correctly functioning mapping functions Fi(MP_T), it is advantageous if more advanced systems can optimally determine mappings themselves, in particular if the automatic grading unit (203) is arranged to determine its automatic color mapping algorithm in accordance with a quality criterion that estimates a difference of an amount of information in the luminance-correlates of pixels in the high dynamic range input image (M_HDR) and an amount of information in the luminance-correlates of pixels in the second low dynamic range image (GT_IDR).

The skilled person will understand there are different ways to define amounts of information, but they all involve measuring how much data there is in a representation (especially meaningful data). There may be semantically-blind methods, which only measure the available colors, but not which region or object they come from. E.g., one may measure how many of the luminances of the M_HDR map to a single luma of GT_IDR. If e.g. most luminances map only two-by-two, but in a certain region of the M_HDR luminance axis 5 digital values of HDR's luminance (or in a floating representation a span of luminances exceeding a certain size) map to a single GT_IDR luma, this may be seen as a too large information loss. So the size of spans, or amount of digitized luminances in M_HDR is an example of a possible amount of information measures. Of course these measures can be made more smart, by e.g. looking a how they behave over particular interesting subregions of the M_HDR luminance range, or even semantic object like e.g. a face. It can be prescribed that e.g. each face should be represented by at least 50 luma codes in GT_IDR, or each region of a face having N digital luminances in M_HDR (or a continuous span equivalent thereof) shall not be represented in GT_IDR by an amount M of lumas of less than half of that amount N. This can be finetuned based on non-linear meaningfulness for humans given the non-linear mapping function. E.g., one can specify how many just noticeable differences JNDs a certain coding GT_IDR when reconstructed to REC_HDR under a reference HDR viewing environment would correspond to. And then one can specify that the face should be reconstructable with at least R discriminable JNDs. Or a structure in a face like a wrinkle should change from a darker value inside the wrinkle to a brigher value outside the wrinkle by a reconstructable step of maximally S (say 3) JNDs. We also introduce the concept just careable differences JCDs which can be used for some semantic objects. E.g. in a lamp, it may be sufficient that the lamp is bright, and still something of the interior structure (like a bulb shape) is discernable, but neither the exact value of the lamp, nor of the bulb, nor there relative luminances may be critical. In that case both regions may be encoded as considered precise if within e.g. 1 JCD, which may be e.g. 20 JNDs, or specified as a difference or fraction of luminances (for luminances falling in a defined subrange of bright luminances to be used for rendering lights). So the information criterion may be determined based only on one- or three-dimensional binning (shape and/or size) of color data in both images, on statistical criteria like the luminance or color histogram and in particular semantical information of which regions may be more severely deformed (e.g. the human grader can quickly draw a scribble on image regions which have to be encoded with high precision like the main-region of action, which may be specially lit during capturing, or a face), geometrical information, like e.g. edges or shapes of structures in object regions and how they deform (e.g. clear visibility, or contrast) under certain classes of mappings, or texture characterizers (e.g. in complex textures a greater amount of artefacts is allowable), or semantical information like automatic detection of particular objects, or the human-characterization thereof (by at least roughly marking a region and ac class like "less critical lamp"), etc. So the skilled person can understand there can be various ways to predefine a system of mathematical functions which specify when too much data has been lost, e.g. reducing the quality of a texture-less varying illumination over an object, etc. There may be one single criterion, or a set of criteria which results in a full analysis of the image GT_IDR, and mark that a certain region thereof has to be redone. With this information the image grading unit can determine whether a mapping satisfies the technical requirement, or can determine a new mapping, e.g. by slightly adjusting the old one. E.g. in case one region of the GT_IDR still reconstructs one region (e.g. an object) of M_HDR too coarsely, the image grading unit can either fully redetermine e.g. a global mapping (typically of course it may only finetune the mapping for those M_HDR luminance regions which pose a problem, e.g. it may increase the derivative of the Fi(MP_T) downwards mapping function for the problematic luminance subrange, which typically corresponds to outwards shifting—respectively to darker resp. brighter values—of the other pixel colors, and adjusting to the new available range for them by a soft bending of those parts of the mapping function). Or the image grading unit can derive an additional local grading to be applied in temporal succession, e.g. a preboosting of that region, and saving in a co-encoded partial (correction) image, etc. Typically it is advantageous when the image grading unit, even when it creates GT_IDR with pre-acknowledged suitable color mapping strategy, post-determines when the GT_IDR image indeed satisfies the condition that REC_HDR is an approximation of sufficient quality.

Advantageously the automatic grading unit (203) is arranged to determine the monotonous mapping function (Fi(MP_T)) from luminance-correlates of pixels of the high dynamic range input image (M_HDR) to luminance-correlates of pixels of the second low dynamic range image (GT_IDR) according to a criterion which determines respective ranges of luminance-correlates of pixels of the high dynamic range input image (M_HDR) allocated to respective single values of a luminance-correlate of pixels of the second low dynamic range image (GT_IDR), the respective ranges forming a set of luminance-correlate ranges covering the total range of possible luminance-correlate values for the high dynamic range input image (M_HDR). This is a simple way to determine loss of information, e.g. due to excessive quantization. E.g., a predefined size of range to map on a single value versus M_HDR input luminance along the M_HDR luminance axis of all possible values may be defined, which allows for specifying that the brighter objects may be quantized more coarsely. It may be that they are already approximated with significant error compared to the original captured scene (e.g. one need not render car lights exactly with 100,000 nits on the HDR display), so one might accept an additional error in the REC_HDR. This criterion can then be easily converted into e.g. determining a shape of a mapping function, since it should in no place bend so strong as to map a greater range than allowed to a single quantized value, giving the known settings of the GT_IDR coder (e.g. MPEG2 quantization values).

The above describes the inner workings of an encoder which can be used in various apparatuses, like e.g. an intermediate system in an image calculation unit, but it is advantageous if the obtained encoded data is sent outside, e.g. as a signal which can be used by a receiver, i.e. the image encoder (202) comprises a data formatter (220) arranged to output into an image signal (TSIG) the second low dynamic range image (GT_IDR) and at least one of, or both of, data describing the color mapping (Fi(MP_T)) between the high dynamic range input image (M_HDR) and the second low dynamic range image (GT_IDR), and data describing the color mapping (Fi(MP_DL)) between the low dynamic range image (Im_LDR) and the second low dynamic range image (GT_IDR). In principle not all receivers would need both sets of parameters, but it is advantageous if a receiver gets both, and can then e.g. optimally determine how to use all available information to come to a final driving signal for a particular display and viewing environment (e.g. it could mix information of the encoded HDR and LDR grading, to arrive at a new grading, which we call display tunability). Note that although we described our basic system with only two gradings, in the same system there may be further gradings, e.g. a second HDR grading for ultrabright HDR display, or a third LDR grading, or a grading for an MDR display (of an intermediate peak white between say 100 nit and 5000 nit references of the LDR resp. HDR grades), or a grading for sub_LDR displays, and these may be constructed as independently designed add-ons, but also according to the presented inventive philosophies, e.g. one can derive a second technical grading GT_IDR2, which is an HDR technically derived grading from the M_HDR and serves for defining the ultraHDR gradings. E.g. the GT_IDR2 can be derived by simple mathematical stretching of the brightest light regions, but the grader can correct upon this by defining further mapping data Fi(MP_DHH) e.g. for correcting by mapping from GT_IDR2.

The image encoder corresponds to an image decoder (401) arranged to receive via an image signal input (405) an image signal comprising a second low dynamic range image (GT_IDR), and data describing a first color mapping (Fi(MP_T)) enabling reconstruction of a reconstruction (REC_HDR) of a high dynamic range image (M_HDR) on the basis of the second low dynamic range image (GT_IDR), and data describing a second color mapping (Fi(MP_DL)) allowing calculation of a low dynamic range image (Im_LDR) on the basis of the second low dynamic range image (GT_IDR), the image decoder comprising an image derivation unit (403) arranged to derive at least the low dynamic range image (Im_LDR) on the basis of the data describing the second color mapping (Fi(MP_DL)) and the pixel colors encoded in the second low dynamic range image (GT_IDR). One will see from this decoder that it can access mapping parameters to color map an LDR image both upwards, to a REC_HDR and "downwards" to obtain a content-creator desirable LDR grading Im_LDR. The image derivation unit will have functionality (e.g. loaded software or hardware parts of an IC) to perform the required (e.g. pre-agreed) decoding color mappings. One can also see that the technical grade GT_IDR is a technical grade, since it will have less mood (even without comparing with the optimal Im_LDR) as the luminances of the objects are not in the optimal place along the luminance axis, will typically have some lesser contrast, somewhat brighter darks, etc., and of course a limited amount of codes for the various object regions in the image.

Advantageously the image decoder (401) comprises a system configuration unit (402), arranged to determine whether the decoder is connected to and/or supposed to derive an image for at least one of a high dynamic range display (411) and a low dynamic range display (416), and the system configuration unit (402) being arranged to configure the image derivation unit (403) to determine at least the reconstruction (REC_HDR) in case of a connection to the high dynamic range display (411), and arranged to configure the image derivation unit (403) to determine at least the low dynamic range image (Im_LDR) in case of a connection to the low dynamic range display (416). Our system (i.e. encoded signal, and various types of decoder) must be able to work with simple decoders which e.g. receive an HDR encoded as our above LDR container in GT_IDR, but need from this only the LDR for an LDR display. They will then ignore most of the information, and only extract GT_IDR and FI(MP_DL), and calculate Im_LDR therefrom. More sophisticated decoders will e.g. determine on the fly with display they are connected, e.g. wirelessly, and supply various combinations of all the received encoded information optimally to the various connected displays (e.g. same movie to parents in attic cinema room, and to child in bed watching on his LDR portable).

So advantageously the image decoder (401) as claimed in any of the above claims having as an output a wired connection (410) or a wireless connection (415) to any connectable display, and a signal formatter (407) arranged to transmit at least one or both of the reconstruction (REC_HDR) and the low dynamic range image (Im_LDR) to any connected display.

Also advantageously the image derivation unit (403) is arranged to determine a further image based on the reconstruction (REC_HDR) and the low dynamic range image (Im_LDR), or the second low dynamic range image (GT_IDR) and data describing the first color mapping (Fi(MP_T)) and data describing the second color mapping (Fi(MP_DL)). This allows determing optimal final grades (e.g. direct driving signals) for various connected displays (display tunability, e.g. getting via a measurement of the display a value of the surround illumination etc., and optimizing therewith the display driving signal).

The image encoder may be comprised in various apparatuses, e.g. its image signal input (405) may be connected to a reading unit (409) arranged to read the image signal from a memory object (102), such as e.g. a blu-ray disk.

All embodiments of the above apparatuses may be further realized as equivalent methods, signals, signal-storing products, in various uses or applications, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings.

DETAILED DESCRIPTION OF THE DRAWINGS

Figure 1:
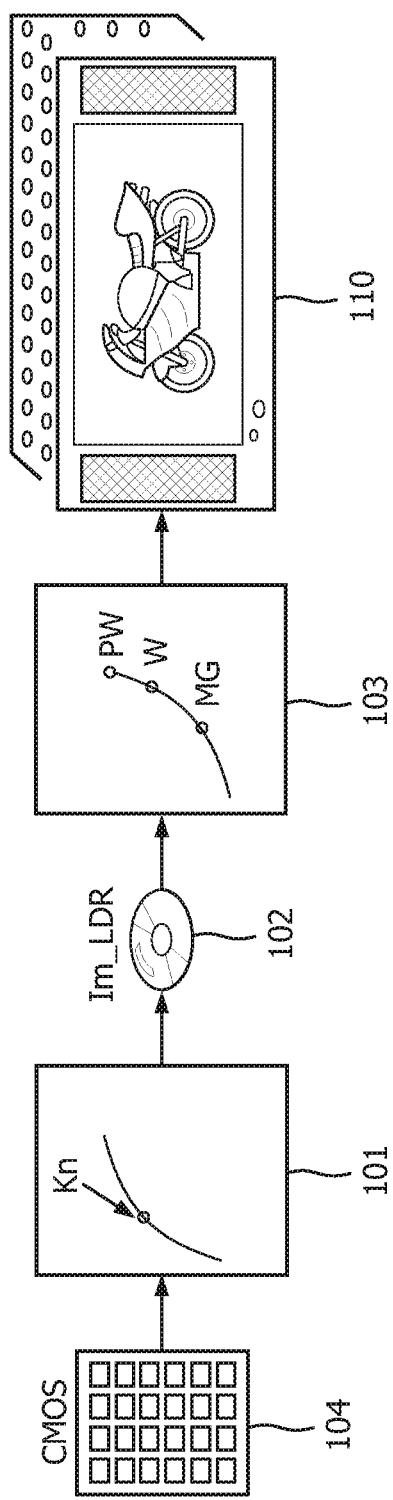
FIG. 1 schematically illustrates a legacy image or video encoding system, as exemplified with a camera with tunable kneepoint.

FIG. 1 shortly summarizes the ideas behind all classical image and video encodings, which we call LDR encoding. Suppose we have say a professional television camera (although similar considerations apply to consumer still cameras) capturing light with an image sensor 104, e.g. a CMOS sensor. This light will after an ADC be in a linear space which correlates with luminance (in principle being luminance times a scale factor when ignoring noise, ADC non-linearities, etc.), and will e.g. be an R,G,B so-called raw signal (or Cyan, Magenta, Yellow, Green or similar for other sensors but these will then be matrixed to RGB, so we can focus on that). The principle of this LDR capturing is that a signal should look good on an home television (which used to be a CRT of approximately 100 nit peak_white, or somewhat darker or brighter). In a studio a director, camera operator or similar person will directly watch the output of the camera on a reference CRT, to check whether the captured program does indeed look good. The capturing of such an LDR program (in fact the automatic exposure as primarily determined by selecting an aperture setting) is determined by the principle of having an appropriate rendered brightness for middle gray. As this middle grey is via the non-linearity of human vision directly linked the whites in similarly illuminated parts of the scene (and assuming (near)-linear reproduction, up to a scale factor typically, on the CRT also), namely it corresponds to objects reflecting approximately 18% of the infalling light. The lighting designer sets his stage lighting so that around the action the lighting is relatively uniform (e.g. 3:1 contrast ratio), and maybe also lights up some corners of the scene to avoid "black holes" in the final rendering. Now having a display 110 with a maximum achievable peak_white (this is especially true with e.g. LCDs with some fixed TL backlights, but also with a CRT in which the beam strength could be controlled via a contrast setting, for any setting there is still a maximum achievable brightness), it doesn't mean that this exactly has to correspond to the white of say a highly reflecting paper in the scene's sweet spot. Because of the always existing variation in illumination, especially for the moving action in the video that would be impractical, and when one moves the paper into a zone of somewhat higher illuminance, quickly an undesirable clipping might occur. So one needs a little bit of safeguarding on the bright side, although for typical LDR scenes and programs, that need not be very much. On the dark side one simply lets the signal disappear in the noise of the camera. So on the bright side one will render the white at a position W below peak_white PW. Not too much preferably, so that it still looks white and not light grey (there's some latitude on that for natural pictures comprised of object). Also the middle grey MG, and the colors of human faces which fall around that, will then be reasonably visible, since they will be reasonably bright in the rendering. So that is the minimum requirement of any capturing or grading, that we can nicely see the acting of the actors in their faces (and eyes which may be somewhat shadowy due to their protruded location in the sockets), and more specifically, the face colors of all those beautiful actors will look appealing (and not too muddy or pale). The rest of the (e.g. darker) colors then become reasonable along the curve automatically. One typically uses a curve which is about a square root, historically because of the behavior of the CRT (electron gun non-linearity modulated by face plate illumination etc.), and still uses that very useful curve because it happens to model the lightness characterization of human vision (i.e. luma values are approximately lightnesses, the former being the mathematical encoded value in e.g. a Rec. 709 space, and the latter the psychovisual appearance for a human). Now the television can do some simple transformations on that curve, e.g. it can boost all values by a multiplicative factor. Such operations, e.g. to counter for a change in viewing environment, have an impact on the psychovisual image appearance properties like the image contrast, and the contrasts of its objects. The camera can do similar operations. Now the question is where to position the luminances like MG optimally, and how to easily do that. In a simple system, an encoder 101 in the camera can transform all values between the Max_Luminance of the raw signal and whatever lies beneath, by bending them with a square root function defined from that Max_Luminance. Then all possible camera-captured values from the scene will be encoded in an image Im_LDR (here shown on a coded image comprising medium 102, like a Blu-ray disk, but it could also be a signal over a cable or the airways) so generated (typically one quantizes the values to e.g. 8 bit, and may perform other operations like image encoding operations like approximation with discrete cosine transform DCT decompositions). By squaring the values of the coded lumas, a decoder 103 can retrieve with the display the original luminances of the scene as captured again as display-rendered luminances. Now in this tightly controlled system, there is a degree of freedom to accommodate for the minimum variations in a typical LDR scene. Using this square root allocation blindly, it may happen (if one determines the maximum on the scene on highly lit objects, by determining the exposure for those objects to have them still well-captured) that the middle gray and face colors fall too dark on such a curve. If there are many bright objects which should be reasonably well-captured, one would like a code-defining curve which goes down somewhat more slowly starting from the brightest RAW code. This can be done by offering the camera man a controllable knee point. He may e.g. select with the knee the input luminance level corresponding to his action sweet spot white, and put that e.g. on 90% of maximum luma code (corresponding to peak_white on the display). He then has 10% of codes remaining for encoding all values above that, and he can adjust the slope of the part of the curve above the knee, to incorporate e.g. luminances up to maximally 600% of sweet spot white luminance. In this way he can tune his curve corresponding to the more plainly or contrasty an LDR scene is lit. If it's a low contrast scene he can put his knee point near maximum luma, and hardly encode any luminances above sweet spot white, and if he desires to have a lot of high luminance information in, e.g. in a talk show where they talk about shiny metal silverwork, he may incorporate some of the bright shiny highlights in the coded luma signal. This simple system so automatically adapts to the best grading of a particular LDR scene on the display side, i.e. it makes a little extra room for the silverworks highlights by darkening the darker colors somewhat, and pushes some visible structure into the brighter objects (majorly deformed compared to the original scene luminances for those bright objects, and often with pastel colors due to the gamut shape of RGB systems, but existing to some degree nonetheless). However, such an LDR system quickly clips for higher brightnesses, and is not suitable to encode e.g. the outside world visible through the studio windows, which world is not cared about. Sometimes this leads to strange situations when a field working camera man decides to photograph a person at the end of his living room where it is relatively dark. Then half of the captured image showing the lighter parts of the room will be clipped to white when well-exposing for the face. Where that may still be a minor nuisance on an LDR screen where the whites just show as some "white colored objects" but not really luminous regions, this leads to quite a weird situation on a 5000 nit display where half of the picture is glowing extremely brightly.

So the LDR system, its philosophy but also the capabilities inherent from its technical construction, is not suitable for HDR capturing, where at the same time one wants to capturing a first illuminated part of a scene, and a second much (e.g. 100 times) more brightly illuminated part of a scene, and maybe simultaneously even a very dark part, etc.

Figure 2:
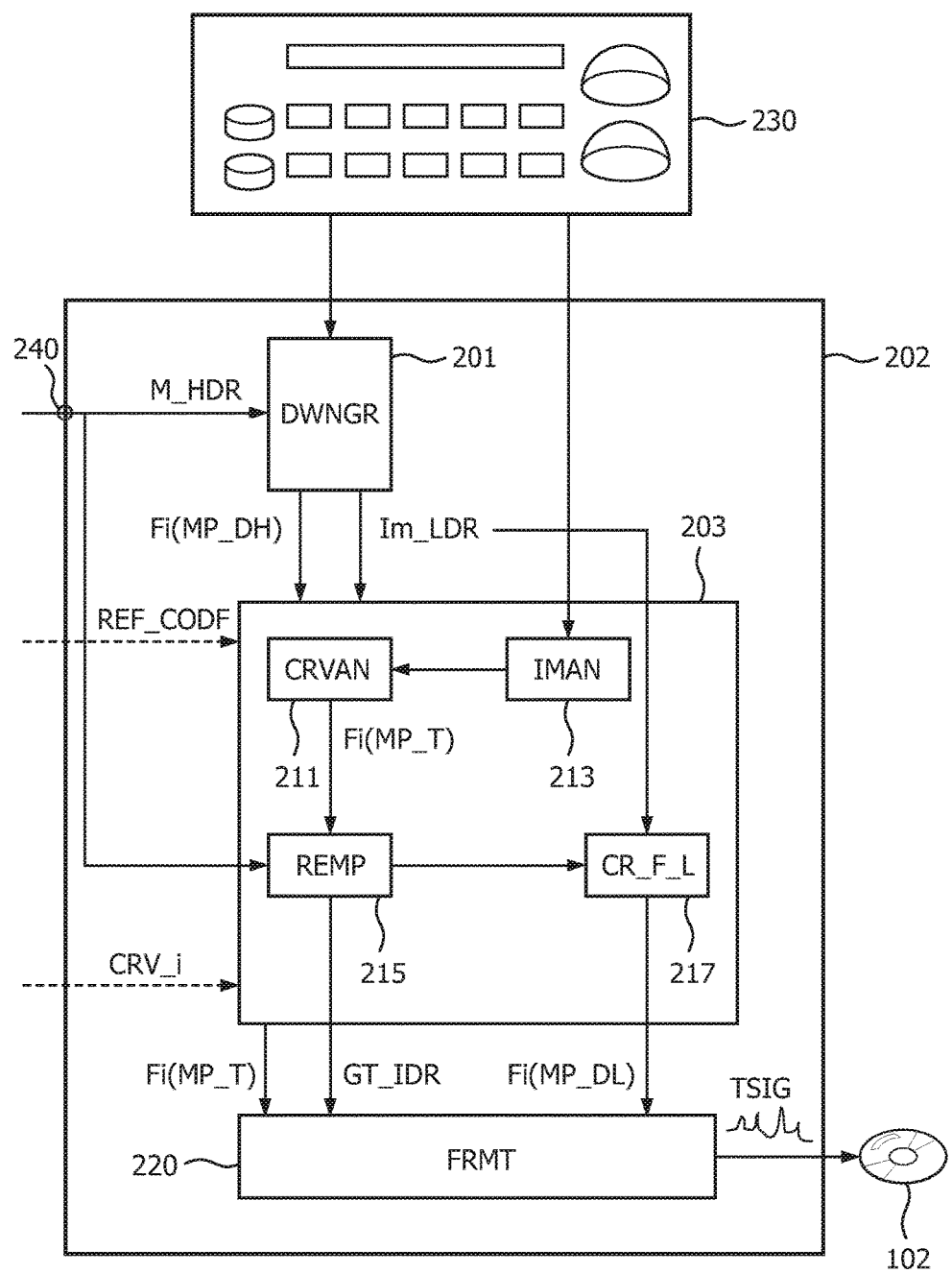
FIG. 2 schematically illustrates a first possible realization of our image coding system, in which the automatic grading unit derives the automatically graded second LDR image GT_IDR on the basis of a prior human LDR grading.
Figure 7:
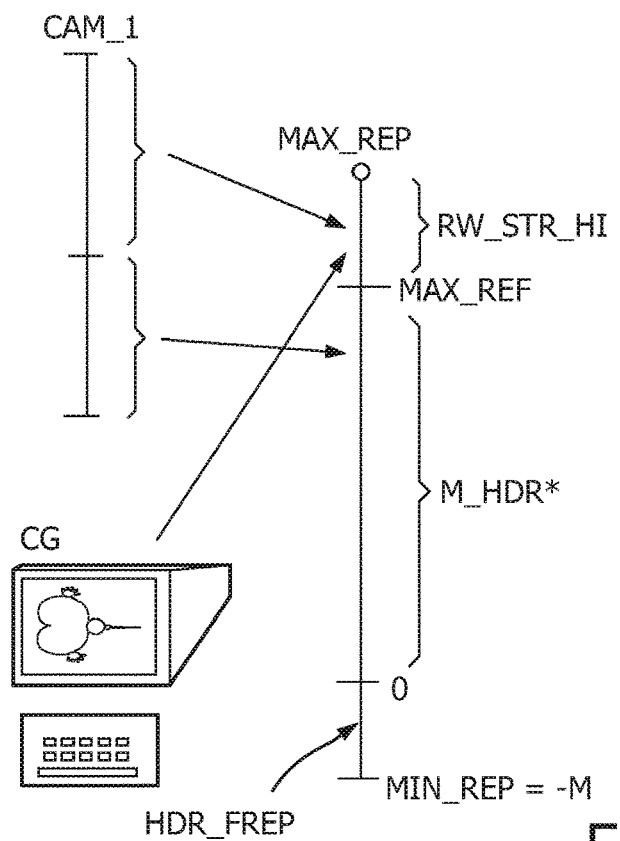
FIG. 7 schematically illustrates a way to define our starting input which is a master HDR grading M_HDR, and shows how data from a camera or computer graphics system can be written into such a mathematical color specification, in particular along the range of its luminance-correlate.

With FIG. 2 we now elucidate some of the principles behind variants of our invention, namely a particular embodiment of an image encoder 202 incorporated in a grading system. Shown is our automatic grading unit 203, as being part of a grading system. Such a system may e.g. be a computer running grading software, but it could also be a less complex system in which a human e.g. only at times modifies some settings of a color mapping from a remote location. A human grader can specify his desired color mappings via a user interface system 230, which may e.g. comprise a dedicated grading console with trackballs etc. Coupled with the software, he can so increase e.g. the color saturation of a selected image region, or drag a marked point on a tone mapping curve (e.g. red component in versus resultant red component_out for all pixels) upwards. We will focus our description on what happens on typically an already optimally pregraded master HDR image (e.g. received via an input 240 connectable to e.g. a data server, or internet connection, etc.), although that might as well come straight from a camera, which may e.g. internally have done some grading. With FIG. 7 we describe an exemplary system of how one can define such master HDR gradings or images. Any camera-capturing or grading is in fact just a representation of a world scene, which needs to stimulate a human to get a reasonable impression of that world scene, so it needn't necessarily be an exactly accurate representation. In fact, one always needs to cross the difficult boundary from scene-referred, in which the camera just acts as a linear measurement device, to display-referred, in which a display needs to emulate to a human the original scene in a very different setting (although some of that complexity need not be handled in the master encoding, but can be deferred to the display transforms). One can discuss whether a master encoding should be able to accurately encode e.g. the sun, where a display will never accurately render the sun (which even when possible and sensible power-consumption-wise, would be very irritating to the viewer on smaller screens). So why not allocate it to e.g. a fixed high luminance code (e.g. a pseudo-sun of 20000 nit instead of 1 billion nit). Furthermore, a problem with scene-referred systems that are able to encode all kinds of values that are not easy to make visible, is that it is not easy to work with these color spaces. E.g. if a grader was to adjust the saturations of some saturated flowers which he cannot perceive on his current grading display, he may be making ugly colors for whenever that image is shown on a better display which can show those colors. Perhaps that is a later reparable operation, but one could ask why one does it in the first place, at least on those colors. In the HDR encoding embodiment of FIG. 7, we give a lot of value to a large range of luminances, which can be reasonably accurately encoded (/graded) on a range of luminances of a high quality HDR reference display, e.g. of peak_white 10000 nit (corresponding to a luminance value MAX_REF in a full HDR representation HDR_FREP). The idea is that one could have at least the most interesting colors characterized in such a high dynamic range specification, and the grader can actually see them, and optimally position the luminances of various scene objects compared to each other (e.g. darken the clouds). This range of e.g. 0.01 nit (which we may simply call 0) to 10000 nit of displayable colors will be our master grade M_HDR*, since we can optimally grade it. The idea is that any display of lesser dynamic range can derive its to be rendered colors starting from the specification of the colors within M_HDR* (typically we will extract from the full HDR image representation HDR_FREP, this range as input M_HDR for our system of e.g. FIG. 2). This specification will probably also work reasonably well for displays with higher dynamic range. E.g. the grader may approximately grade some bright lights of the scene, so that they will at least show bright on any display rendering. He may encode in the reference grade M_HDR* for the HDR reference display the brightest light at say 99% (linear) of MAX_REF, and he may encode another bright light to be still bright but contrastingly definitely less bright at say 80% of MAX_REF. An actual 20000 nit display may use simple scaling on the codes of those lights, e.g. boosting both with a factor 2, which merely corresponds to similarly (percentual) referencing them to its higher peak_white. In this case both lights may be somewhat brighter—as they could have been in the original scene—but largely the look of that HDR rendering is still similar to the reference look on the 10000 nit reference monitor of the grader. Actually if one wants to more accurately encode values higher than what can approximately be encoded in the M_HDR* (e.g. suitably darkening a light so that it falls within range, yet with a similar look, i.e. the exact scene luminance of that light being irrelevant) one may do so in the color space definition of FIG. 7, irrespective of whether one would like to use those values later for a higher dynamic range display to more accurately render those bright colors than with a stretch of the values encoded in M_HDR*. So one can still add some really bright (or really dark) colors outside the range M_HDR* of what would typically give a really good rendering of an HDR scene, and one may typically strongly compress those colors, i.e. represent them with only a couple of values, with the codes in HDR_FREP being highly non-linearly related to the actual scene luminances. E.g., when looking at a very high contrast scene like e.g. a welding scene at night, there may be a long time nothing above the range M_HDR* encoding the useful objects, and then there are the luminances of the arc. We may represent those with a strongly posterized shape of the arc (i.e. a few codes) and put them right above MAX_REF. This would already be one way to have a reasonable representations of that arc (already gamut mapped to colors which are near to those which are typically renderable on a HDR display), but if one wants one can also shift in metadata a function of how to shift them to luminances more close to the actual luminances in the scene (e.g. a luminance offset constant). We show a range of capturable luminances CAM_1 of a HDR camera which can do this capturing, and one part of it is encoded within M_HDR*, e.g. directly by (possibly with a linear contrast multiplier) allocating the relative luminance values to luminance values within M_HDR*, or one can already use some mapping function doing automatically a first kind of grading (e.g.

pushing the brighter or darker luminances somewhat more together). The brightest luminances captured by the camera are then stored in the overflow range RW_STR_HI up to the maximum MAX_REP of the color coding. We have shown an example where we encode a certain level of darks onto the code 0, and can with some mapping store even darker luminances in negative values up to MIN_REP. We also show how e.g. special effects people can draw into the color coding HDR computer graphics CG, like bright explosions.

Returning to FIG. 2, the human grader uses the image grading unit 201 which is arranged to do any of a set of color transformations. This may be a limited set of color transformation functions following mathematical criteria like e.g. reversibility (with reversibility we normally mean that in a sufficiently precise color encoding, like with floats, one can reverse the function to re-derive an input image from its output image after applying the transformation; with color we mean at least a luminance-correlate of a pixel, region, or object color specification), or preferably it's a broad set of functions which allow the grader to grade the image in any manner he likes. Examples of typical functions are those supported by e.g. Da Vinci Resolve, or Adobe Photoshop. Internally at this stage we may assume that all processing still happens in [0.0, 1.0] float encodings of the color coefficients, with the precise definition including quantization coming in at a later stage in the image grading unit 201. However the output LDR image Im_LDR will typically already be encoded according to the image or video encoding standard, e.g. for non-compressed signals it may be quantized in an YCrCb color space, or it may be wavelet compressed, etc. The actual formatting of this image, e.g. the chopping into data blocks, whilst inserting headers and other metadata will typically be handled by a formatter 220, which outputs an image signal TSIG, e.g. towards a memory for images 102. This signal may be stored on that memory according to e.g. the blu-ray disk specifications, or according to some definition for storing on a flash card, or hard disk etc. The skilled person will understand that similarly the image signal TSIG can be sent over some data connection, e.g. wirelessly to a home server with permanent or temporary memory for storing the TSIG or the image(s).

Figure 8:
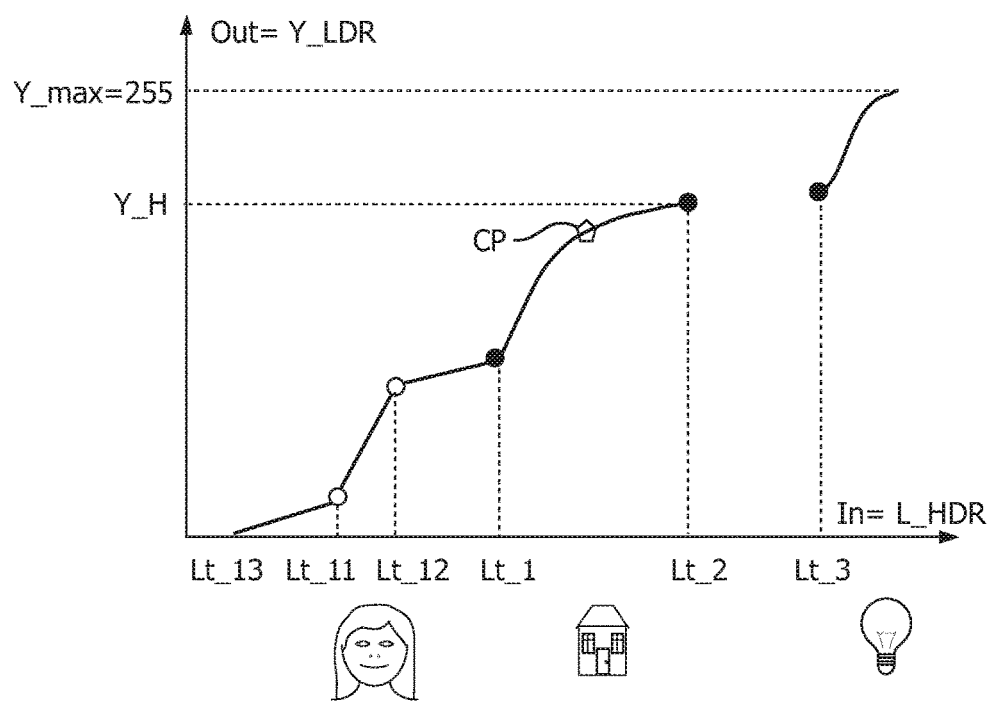
FIG. 8 schematically illustrates an example of a color mapping strategy, namely a luminance mapping part thereof.

In FIG. 8 we give an example of how a grader can grade starting from an input image to create an output image. We will focus on the relationship of the brightnesses of subranges, and later on give a few examples of how to handle the chromatic components of the pixel colors. Assume that the input (In) HDR image pixels are encoded with their luminances L_HDR, and the output values in LDR are encodings so we call them lumas Y_LDR. Although our methods are by no means limited to particular bit depths, assume the lumas range in [0,255]. Now the grader will study the particular input image to process (for video this will be a key image in a shot of images to be color mapped similarly), and design an optimal color mapping, in the example a multisegment mapping according to his preference. Suppose we have a covered part (e.g. under the shade of trees, where the main actor resides) below HDR luminance Lt_1, and some houses in the background which are brighter. So their HDR pixel luminances will fall above Lt_1, but it is not necessary that the darkest one falls directly above Lt_1. Furthermore there may be a very bright lamp with luminances above Lt_3. Now this scene is different from our above classical LDR scene. We have two interesting scenes, the shade around the actor (in which we desire to make the actor well-visible, yet clearly darker than most of the scene) and the sun-lit houses in the surrounding background. The grader can e.g. elect to make the region between Lt_11 and Lt_12 which contains the face colors sufficiently bright and contrasty, to make the face clearly visible. He may do so at the expense of darker colors, which need to be encoded with few Y_LDR code values, and below Lt_13 they will even be clipped to Y_LDR=0. He will also encode/grade with less contrast/precision the luminances between Lt_12 and Lt_1 by lowering the slope of that segment. This creates room in the Y_LDR range for the sunlit houses, which he writes in with curve defined by dragging a control point CP. The lamp colors after a luminance discontinuity of non-occuring colors, can be encoded right above the end of the houses luma Y_H, or starting a couple of codes (e.g. 10) above that.

Now in our LDR-container philosophy this color mapping curve can both function as a color look-optimization curve for the output picture, i.e. e.g. typically an LDR grading derived from an HDR grading, but also as a code-defining curve. Analogous to the gamma 0.45 curves of e.g. MPEG, which define a luma coding for each input or rendered luminance, our optimal curve defines the allocation of particular code values to the various luminances in the input HDR image. But hence simultaneously the various image objects or their luminance subranges also are already correctly positioned along the luma axis for directly (or perhaps with minor transformation, which may involve physical display characteristic precorrection like EOTF handling, or minor tuning towards a particular e.g. darkened viewing environment via a simple display transform) driving of an LDR display.

So we have changed or generalized a couple of fundamental truths of the LDR encoding technology. In particular, asking the question of what is white in HDR (the white paper in the sweet spot illumination indoors where the action occurs, or the white paint of the sunlit houses outside; with the human vision also capable of very cleverly handling all those semantically), we have abandoned the vision of tying everything to a particular white, or a correlate thereof like "the" middle grey of the scene/image. As an alternative thereto we come up with color regimes, which can function on themselves, whatever the luminance relationship with particular colors like some white. E.g. there can be the regime for the sunlit houses or the lamp, which can have their own handling, which now without necessarily accurately referencing can be semantic-relational rather than precise numerical. We have already given the example of a bright outdoors, or a very bright light. Instead of with a fixed luminance relationship making the (e.g. average, or lowest) outdoor brightness e.g. 5× brighter, we can make them just "a fair amount brighter". The fair amount can then be determined ultimately at the display side. E.g. a very bright HDR display of 15000 nit may make the outside 20× brighter, but a limited one may need to cram all sunlit houses colors in an upper range which is just on average 1.5× brighter than the indoors colors, just giving an initial simulation of the fact that it is sunny outside. Similarly, a dark region can be rendered not as exactly with luminances Lx, Ly, etc., but as "barely discriminable". Smart HDR decoding and optimization systems can take the specifics of the display and environment into account, and can further optimize starting from the defined grading tune the final driving signals.

So secondly this means that we abandon the concept of a single fixed code defining curve like a master overall gamma 0.45 which being close to human vision is considered to be suitable at least over the entire LDR range of luminances. Whether we use any color grading as strict (i.e. the display should try to render it as close as possible as it would look on e.g. an LDR reference monitor, i.e. with minimal own tuning) or as liberal (where the grading is just a relative guidance, stating approximately how one can deform the colors to keep somewhat of the artistic intent in e.g. a more limited physical range of luminances), we will allow the grader to create in some embodiments even arbitrary code definition functions, which may even be discontinuous functions.

And thirdly, we state that there should no longer be a single graded image, but rather the gradings need to be optimized for each rendering situation. And human vision being complex, especially the more rendering systems vary in their properties, the less correctly this can be done with (especially simple) automatic color mappings, and the more several gradings should be optimally made by human gradings. But in practice we see that for many scenarios given necessary investments, it will be sufficient to have only two gradings (a classical for LDR, and an HDR grading for the HDR systems), and where more precise tuning is needed, the systems can then closer approximate good gradings by technically interpolating or extrapolating them on the basis of these two gradings from their comprised artistic information.

Stopping after the grading of Im_LDR, and writing that LDR container image onto an image memory together with a prediction function for reversibly reconstructing an approximation of the master HDR M_HDR from it (perhaps for some systems a grader using strictly reversible color mappings is not necessary, since for lesser quality systems it may be enough to reconstruct a REC_HDR with significant deviations from M_HDR, as long as the HDR effects derived from the Im_LDR data still produce a reasonably similar HDR look, in which case one may co-encode such HDR reconstruction color mapping functions, which have inverse which then are approximations of the actual color mappings used by the human grader), would be good for systems with e.g. 12 or 14 (non-linear) bits defining the Im_LDR encoding (depending on the requirements of the various applications). When going to tighter specifications, like e.g. 8 or 10 bits (of which most people would say they are difficult to encode HDR images, but since humans only discriminate only a couple of million colors, and depending on the application like a fast moving video with considerable noise the amount of needed colors may be even less, so if one were to encode the required most important colors into the 8 bit correctly that should be possible), it may be useful to do the further steps of our invention to guarantee an improved quality of both the LDR and HDR grading, whilst allowing the grader maximal flexibility as to how those gradings should look (i.e. in which luminance (-correlate) subranges all objects should fall).

We now assume in the continuation of our FIG. 2 example that the grader grades very liberal with an arbitrary luminance-mapping function, and the LDR lumas are quantized to only 8 bit. The slope of the mapping curve between Lt12 and Lt_1 may be so low, that there are too few codes to faithfully represent those colors, e.g. of vegetation in the shadow. In an LDR rendering that may not be so objectionable (indeed it isn't or the grader wouldn't have specified the curve in that way), however, upon reconstructing the HDR luminances for these objects, the posterization may give an objectionably low texture quality to those objects in such a high quality rendering.

Therefore, the automatic grading unit 203 is going to analyze the LDR grading Im_LDR of the human grader, and identify and solve such issues. There are several ways the unit 203 can do so. It can e.g. purely look at the images themselves, and compare spatial regions thereof. E.g. it can look at a region in Im_LDR (such as a dark face) and count the number of luma codes representing it. The internal rules of the unit may specify that any region, or especially a face region, should not be represented with less than MB (e.g. 10)

different code values (or in general a number of colors, typically based on the number of lumas thereof, but similar restrictions may be counted on the number of representable different saturations e.g.). Or the unit 203 can compare the amount of codes in the region in Im_LDR with the amount of different codes (typically luminances, but M_HDR could be encoded with different luminance-correlates too) in the HDR image. If there are many different values in M_HDR, there should be a reasonable number of lumas in Im_LDR for that region too. E.g. the rule can be that the fraction of the Im_LDR lumas versus the HDR luminances should not be less than $\frac{1}{5}^{th}$, or $\frac{1}{10}^{th}$ etc. One can similarly define relationships based on ranges in floating point luminance space for M_HDR. More complex image analysis can be done, e.g. studying geometrical shapes and estimating how such shapes deviate when represented by less colors. E.g. a detector can identify blobs in shapes. This is a generalization of a banding detector, which checks whether there are runs of a number of pixels having the same posterized value in Im_LDR or in fact REC_HDR, where they do not exist, and are in fact smooth functional transitions in M_HDR. Further information can be obtained from texture estimators, which may determine e.g. the local complexity of image regions, etc. Even if the determination of the automatic grading GT_IDR is not going to be based solely on the analysis of any of the obtainable images (gradings) themselves, it is useful if the automatic grading unit 203 comprises an image analysis unit 213 capable of doing any of the above analyses, since the resultant data is useful even when specifying a template curve, in a system which works on the color mapping curves of the gradings.

Figure 9:
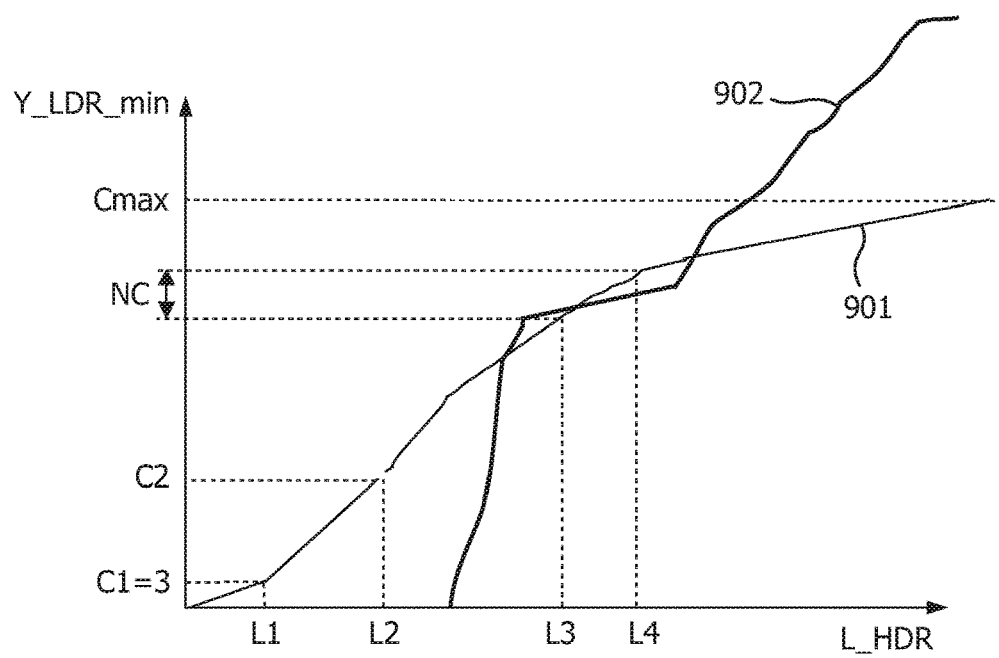
FIG. 9 schematically illustrates an example of how to determine whether any mapping function or algorithm has suitable accuracy for reconstruction of the REC_HDR.
Figure 10:
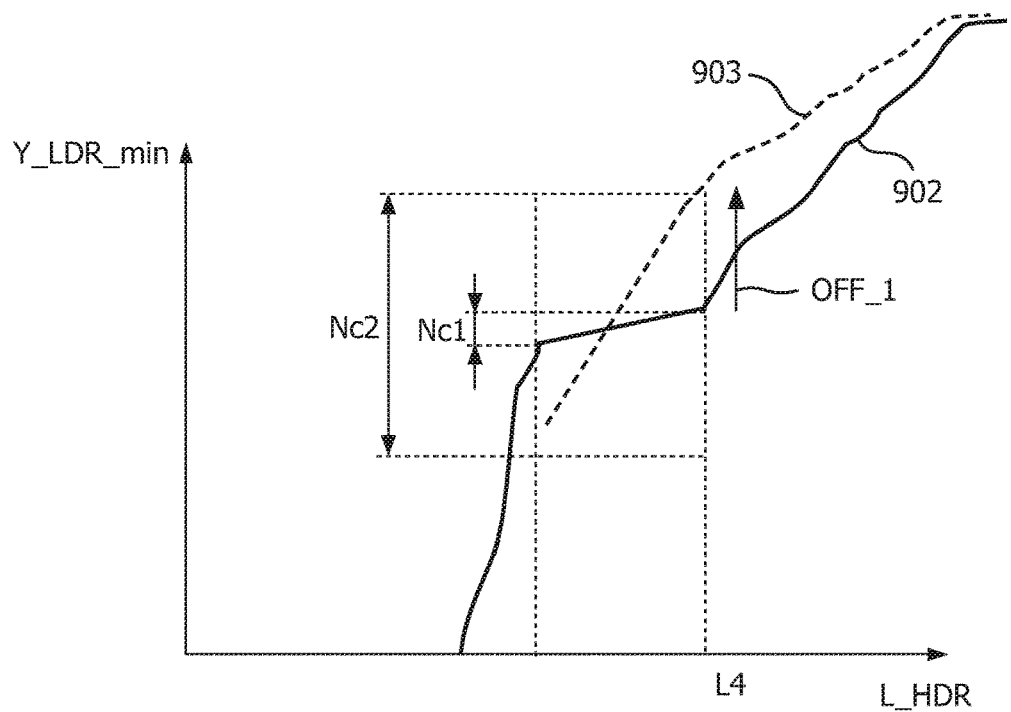
FIG. 10 schematically illustrates an example of how to transform an unsuitable function into a suitable one.

Thereto a curve determination unit 211 is comprised, and we will elucidate some of the possible embodiments thereof with FIGS. 9 and 10. In any case, whether the determination of the automatic grading is performed based upon analyzing images, mapping algorithms like luminance mapping functions or both or any other analysis or prescription, typically the curve analysis unit 211 will have a unit determining and outputting a final color mapping algorithm or function Fi(MP_T) (and possibly also a unit performing one or more of several algorithms of color mapping curve or algorithm analysis, whereby the algorithm can be analyzed in itself, or as how it behaves on colors when represented by curve(s)). This automatic mapping is now how one can derive GT_IDR from M_HDR, so a color mapping unit 215 will derive GT_IDR by applying the mapping Fi(MP_T) to M_HDR. Of course one needs to take into account in this new formulation what the human grading Im_LDR was, now that one will reference everything to GT_IDR. So an LDR mapping unit 217 will analyze how the Im_LDR can be obtained from GT_IDR, and derive the parameters therefrom. If a pixel luminance maps from L_HDR=2000 to Y_Im_LDR=180, and to Y_GT_IDR=200, then one can derive a mapping between the latter. In such a functional form, the Y_Im_LDR values along the range can be derived by applying a per luma function which multiplies Y_GT_IDR by (Y_Im_LDR/Y_GT_IDR). Similar strategies can be derived for other mappings.

With FIG. 9 we elucidate a computationally simple way to redetermine the human grading into a technical grading by studying the human grader's grading curve (whether solely, or aided by image analysis, or potentially even by human grader interaction). We will look at a curve deformation example, but the skilled person can understand that a similar analysis can be used to select one of a set of well-functioning curves (one or more CRV_i curves in FIG. 2). If the grader desires a smooth contrast-less behavior in a middle region, and stretched behavior in outer regions (e.g. on the HDR the predominant regions where the main action occurs may need to be silky smooth, but lamps in the background may be rendered more coarsely, even banding may not be noticeable or at least important, at least in some situations), one can select (based e.g. on a calculation of a functional correlation) one out of a set of pre-agreed curves which matches best such a behavior, but does not have too high a quantization for the middle part. Such a selection may be guided by further image analysis, like determining which class an image belongs to (sunny outdoors, or nightscape with some bright lights), looking at the histogram distribution and its parameters (e.g. locations and sizes of estimated lobes, etc., either (semi)automatically, or by the experience of the human color grader). I.e. there may be a couple of predefined curves 901, which give reasonable behavior, at least from a precision point of view. An actual image has to be coordinated around such behavior, taking the grading look wishes of the grader into account. Of course whether an actual quantization is good versus a theoretical optimal or reasonably working situation is also dependent on how many pixel of particular color there are in a particular image. E.g. if the dark part is just a small patch of looking through a grid into a sewer, say 50×50 pixels in the bottom-right angle of an image, then some quantization may be quite allowable for the grader, at least for that image, shot or scene. I.e. the various curves may both function as a final selection for the technical grading (in case there is one, or a couple master guiding curves—e.g. depending on target display white point like whether the image is intended primarily for 1000 nit or 10000 nit displays, or further characteristics of rendering environment or image properties- determining quantization precision over the luminance or luma range), or they may function as starting points from which the technical grading curve may be finetuned, until it maximally stretches its code precision deformations for the more critical image gradings (typically the to be reconstructed HDR), and from thereon we can encode the further requirements on the other grading look (typically an LDR) merely by transformation functions to be applied to that technical grading GT_IDR.

But now we will describe an exemplary curve deformation algorithm. We will calculate a specific embodiment of an amount of information, which is an amount of used codes NC per luminance subrange (and we may digitize a continuous range in M_HDR also by typically uniformly distributing some integer codes along that range). We will look at a specific test-range under study (between L3 and L4), but, although some embodiments may test only some ranges, like the dark ranges, it is advantageous if all ranges of M_HDR luminance are so tested. One can similarly formulate whether some range of M_HDR is mapped to say 5 Y_LDR codes, or whether a subrange thereof is mapped to a single Y_LDR value.

The method starts from a reference encoding function 901 (REF_CODF in FIG. 2), which specifies how many codes are needed for each range to be well-reconstructable in REC_HDR. The skilled person should understand this depends on, and can be calculated from technical parameters like the dynamic range of the reference display belonging to M_HDR, the intended specifics of the Im_LDR grade etc. Such one or more reference encoding functions, although they could be calculated in any encoderon-the-fly (and may then be optionally outputted in the signal TSIG as metadata), may typically be precalculated in a design laboratory of e.g. a grading software manufacturer and hence in an agreed way stored in a memory of at least the encoder (in principle the decoder does not need this information, but may also have it, e.g. in case functions like Fi(MP_T) are defined as relationships to such a reference function, but that will typically not be the case for simplicity). The encoder may if it has several variants choose one, depending on how the final Im_LDR and REC_HDR are to be rendered, and this may happen with some software selections of the human grader. Function 901 specifies how many codes are needed for each interval of luminances. E.g. in the example it was decided that only three codes of the 8 bit Y_LDR_min (the minimum number of required codes, given an allowed reconstruction or representation error), i.e. in fact of the Im_LDR, will be used for all HDR luminances darker than L1. So these dark regions will be coarsely quantized, but they will have some structure nonetheless. If one brightens these regions up severe posterization of the local image objects may occur (whether in an HDR reconstructed rendering, or a modified LDR rendering via a brightening display transform), but this may have been a final decision to be able to encode enough HDR images in this 8 bit code (if the set of codable images contains critical high contrast multiple regimes images, one must typically at least sacrifice some quality). However, oftentimes the dark regions will be rendered so dark, that one cannot see too much detail in the display face plate reflections of the viewing environment anyway. To be able to reasonably faithfully (given the sensitive human eye when the reconstructed REC_HDR is shown in a dark viewing environment) render the dark colors in the interval up to L2, the curve prescribes that C2-3 luma codes at minimum are required (one may use more codes of course). Defining such a curve means that one may encode HDR images up to a maximal LDR luma Cmax equal to e.g. 255 (if the LDR container has 8 bits available for its luma; n.b. this can be simply seen as the gamut diamond up to 1.0 being fixed, and quantized with equidistant bins, but the distribution of the image pixels varying dependent on the applied transformations, HDR images e.g. oftentimes having a large percentage of the pixels below 0.1), which corresponds, if this 8-bit container is actually encoding an HDR image, to a maximum luminance L_HDR of e.g. 10000 nit, depending on the curve. Note that the curve can be tuned to take into account the relative scaled nature of rendered luminances, and in this description we mean that we can represent HDR reference display luminances between e.g. L1/10 (as a reasonable black still quantizable in the 0 luma) and 10000 nit, but one may of course always adapt by scaling so that some other luminances are represented. For simplicity one can safely assume that both L_HDR and Y_HDR have axes between 0.0 and 1.0, and then quantized to some precision.

The skilled person will understand that this reference encoding function 901 can be specified by several factors. E.g. when the human grader scribbles over a region of the (e.g. M_HDR) image, which may be e.g. a face region, the image analysis unit 213 may therefrom determine a range of HDR luminances wherein those face colors fall. It may then respecify the curve so that more lumas are required to represent it. It may know that e.g. if the grader types a "face" indication button, how many codes (i.e. quantization bins) are typically needed for any situation (i.e. e.g. a face not well-illuminated according to the 36% specification, but e.g. falling in a darker shadow area of the scene making its average luminance e.g. 10%, and the LDR container being e.g. 10bit and a required HDR rendering optimal for e.g. 4000-5000 nit). This would lead to a prescription of a number of bins (typically on the HDR axis, but it could also be on the Y_LDR axis) around the point of average current face color. This may be automatic (e.g. doubling or modifying the amount of JNDs for HDR reference rendering covered by this range), or the grader may directly influence or specify the shape of function 901 in that region. The curve can be specified or re-specified (if needed) on many properties, like e.g. measurements of the HDR image. Now looking at the actual luminance mapping curve 902 of the grading producing Im_LDR (i.e. the grader currently taking nothing into account about quantization and data loss and the like, but just defining artistically where he wants his objects colors to be in the normalized gamut for this image, to realize e.g. a dreamy look with may high brightnesses called high key), we find that in the interval [L3,L4] the amount of actual occurring codes given this mapping curve from the HDR master grading to the chosen LDR look is smaller than the minimum required amount NC for that region (we have shifted the curve for clear superimposition, but of course the determination of used lumas can be simply done for any curve). Note that we have assumed that the lumas are determined equidistantly in the ranges, but one may take non-linearities into account similarly, e.g. by focusing on (dis)allowable mappings to single lumas. But normally on the Y_LDR axis we will have equidistant bins, so we can discuss in that way without losing generality of teaching.

So we currently use too few codes in that interval (which could show as a low contrast in LDR rendering, but probably not as the grader has just optimized this curve, but will typically show up as to coarse quantization for reconstructed HDR images), and need to stretch the local slope of curve 902. There are several ways to do this, e.g. with elastical error functions which penalize quantization errors over any interval. In general we could have any mathematics taking into account on the one hand size of particular intervals, and on the other hand average luminance/luma positions of those intervals, i.e. how much the curve deviates from the intended grading. Of course, if the technical grading demands one needs a particular mapping curve shape which is far off from the shape which the grader desired for the LDR look (i.e. technical HDR-data requirements or the code allocation purpose of the mapping function being far off from the "LDR" requirements or the rendering look purpose of the mapping), then the grader will continue with defining his look in another, additional way, via further mapping functions. So in principle no tight specification or critical mathematics is needed for this method, but of course some methods will be less calculation-complex, or more user-friendly in how swiftly the grader arrives at the desired encoding+grading result (as grader time is expensive, at least for some kinds of program).

We elucidate a simple curve transformation with FIG. 10. If Nc1 is the current amount of lumas allocated to the interval, and Nc2 is the needed amount of codes (whether minimally needed, or somewhat larger), one may stretch that part of the curve by e.g. multiplying around the midpoint with Nc2/Nc1. The rest of the curve has to be modified, and we assume that redistributing the quantization to fit in the total amount of codes will already give a satisfactory result. One can e.g. derive the part of the curve above L4, by taking that curve, offsetting it with OFF_1, and scaling it so that the maximum still falls on the maximum luma. By doing this everywhere one obtains the technical grading curve 903, which is the curve of color mapping Fi(MP_T). The lumas on the Y_LDR min axis will then form the GT_IDR image. The system may check whether there is another range which then becomes critical, and then e.g. balance the error between the two regions. E.g. ideally Nc2 should be 10 codes, and Nc2* on another range of L_HDR (i.e. also Y_LDR) may need to be ideally 8, but if there is only room for a total of 16 codes, one may distribute the minimal quantization error as 9 codes and 7 codes. Of course this can be weighed by such factors as range of the two regions, semantic significance (are there face colors), etc. If necessary, the system can prompt the grader to choose which of the two areas should be better, e.g. with a user interface allowing him to increase the number of codes Nc2 (i.e. the local slope) in steps, which then means less codes for Nc2*, which the grader may think visually acceptable. Of course some embodiments may work fully automatically behind the scene when selecting the technical mapping curve and grading GT_IDR, and in that case the system may e.g. just abandon the finetuning around a preferred LDR grading curve and immediately jump to one of the predefined well-working technical curves (e.g. one that has a least deformation compared to the LDR look defining curve (902), like calculated as SUM(wi*[FT(L_HDR)−FL(L_HDR]), in which the brackets indicate some function like an absolute value or square, the FT is the currently selected technical function per value L_HDR, and FL is the preferred LDR look mapping of the grading, and the weights wi may be uniform, but also weigh certain areas of L_HDR more, like e.g. where the faces reside), in which case the look is then defined by the further mapping function Fi(MP_DL). Error measures may also take slopes into account, since local slope identifies amount of available codes in the LDR representation versus required codes in the HDR region. Note that even changing one interval in fact distributes an error all over the range compared to what the grader would like to see, but that needn't necessarily be a large error, as it is distributed and seen relatively as the eye is not really designed to function as an absolute luminance meter anyway, and in any case it can for most practical systems be calculated away again at the receiving side with Fi(MP_DL). The skilled person understands that there can be many other ways to realize similar functions. E.g., it may be so that there are enough codes (because the M_HDR image doesn't go all the way to L_HDR MAX corresponding with Y_LDR MAX), and one may have a lot of freedom in respecifying at least some parts of function 903, yet curve 902 was still too quantized in interval [L3,L4], and has to be corrected. In such a scenario one may more freely shift the midpoint luma of the interval [L3,L4], and the other curve regions. Such scenarios correspond to brightening of some objects etc. The other scenario is where the system is really critical, and redistributing the quantization outside interval [L3,L4] may lead to inappropriate quantization there. In that case mitigation strategies can be used to determine a final curve. One example of a mitigation strategy is to divide the remaining errors over the most critical ranges, like [L3,L4] and [Lx,Ly] outside where the biggest quantization error occurs for the current grading curve, or any curve trying to keep a reasonably close approximation to the current human grader's curve. One may also decide to allocate the errors strongly to some regions. E.g. one may clip luminances to even somewhat above L1 to the single 0 luma value, or one may decide to clip on the bright end, even in the technical grading GT_IDR. The REC_HDR image is then not perfectly reconstructable, but such scenarios can be used in systems which have an overflow correction. E.g., the clipped values can be encoded in a second image, separate from the GT_IDR, which contains only the data for a bright, clipped region in GT_IDR. When comparing the actual mapping curve with one that has good technical properties (characterized in that it has at least a minimal amount of codes per interval) of course the automatic grading unit will check whether there are actually any pixel colors in that interval, otherwise it may seriously distort the function in that range.

Figure 12A:
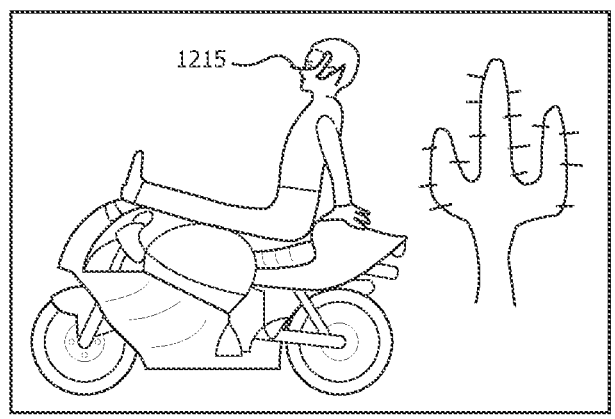
FIG. 12A it is schematically shown how regions of the code allocation curve can be selected by (co)-interaction with the objects in the currently viewed image.
Figure 12B:
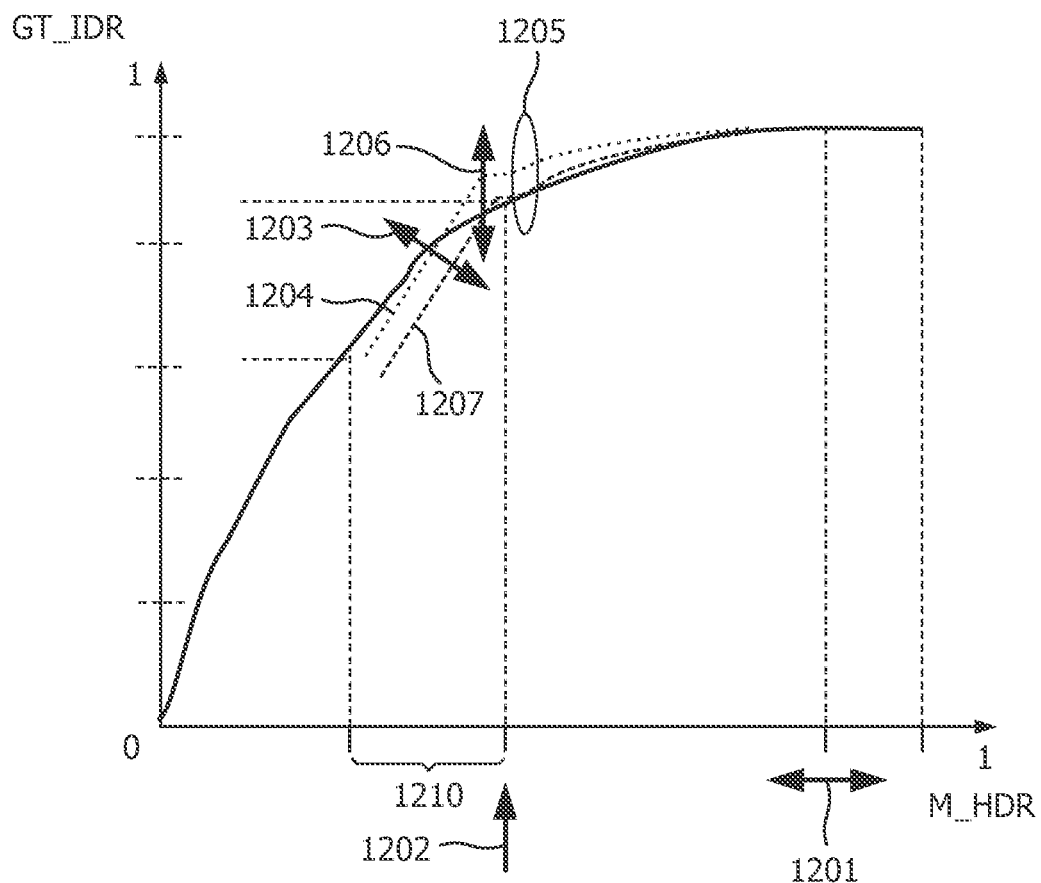
FIG. 12B schematically illustrates how a grader can interact with a code allocation curve to finetune it, FIG. 13 schematically illustrates how one can go from a technical grading which in this example would be usable for LDR rendering already, to a better looking LDR grading, by a very simple parametric transformation realizing a good quality content-adaptive contrast stretching.

FIG. 12 (FIG. 12*b*) shows an example of how a grader can influence the technical curve allocating the codes used for the technical grading GT_IDR. As said all of this can in some embodiments happen behind the screen without the grader knowing it, but here we give an example of how a grader can specify or influence the amount of codes allocated to a particular region in the HDR luminance range 1210, let's assume which contains facial colors. Let's suppose that in this example the automatic allocation of code zones was pretty good (possibly taking into account that we have only 8 bit luma instead of 10 bit available, or perhaps for 10 bit a less appropriate colors space which introduces too severe quantization at least for some colors like e.g. saturated blue) but the grader looking at his quality reference display wants still somewhat more precision, e.g. to have a less blotchy face. He may then consider the local slope in luminance range 1210 to be too low, and may want to increase it via user interface slope changing means 1203, which may be e.g. an arrow which increases if one clicks the top arrow increases the slope with X%, or a draggable cursor, etc. He can specify range 1210 directly in his curve tool viewing window and drag one or more limit setter(s) 1202. The user interface may also aid quick selection, by e.g. allowing drawing a scribble 1215 over the currently graded representative picture from a scene (see FIG. 12*a*).

All this time the grader is looking at the reconstructed HDR image rendering. If he now wants to work on the LDR image again, he switches to that viewing, and specifies his LDR grading further again starting from this technical curve, into an additional mapping curve or strategy. Motion tracking means for tracking the face and finetuning its properties if it walks under variable illumination may aid in the determination if necessary, but in general we will not need such complexity for the present invention, as the technical curve is only supposed to be in general largely good, and not ultimately specific. But in any case the grader can be offered finetuning at any moment of the movie he considers it interesting, of both the technical curve and the mapping curve for obtaining the optimal LDR images. Now the software may be configured to change the slope compared to the midpoint (curve 1204). However, the grader may consider this to introduce grading color issues which he may want to address now (rather than in the second LDR mapping functions). E.g., when the algorithm or hardware calculates the new curve, it will in the simplest versions reallocate the error, which it may do e.g. by stretching the remaining shape of the curve to the maximum 1.0 value, starting from the new high-point of the locally stretched interval. But the grader may consider this to give too bright colors in regions 1205. Therefore the software may have position adjustment means 1206, which allow the grader to shift the local curve in range 1210 upwards or downwards somewhat, yielding the final reasonable curve 1207. The grader may also specify in similar manner regions where he considers the quantization errors may be more severe, e.g. in this case slider 1201 may allow him to set a lower boundary for a range of bright colors which may be quantized somewhat more when needed. If one needs to balance color properties given all technical limitations, this may be a good way to arrive at a reasonable optimum, especially if the original material was not captured perfectly in the brights anyway, but e.g. with somewhat pastellized colors. This sliders then e.g. gives the reference HDR luminance position above which there are e.g. 20 m codes, distributed via e.g.

a gamma 2.2, or psychovisual JND-based curve, etc. In this case the algorithm mathematics can take this into account when redistributing the errors, e.g. by penalizing a difference from the 20 codes in a weighed way with the codes remaining between the high point of range 1201 and that low value of the upper range set by 1201. Of course the grader if he considers the issue critical enough to spend more time may also select one or more of such ranges to finetune, and e.g. add a fixation resistance to the already determined curves, indicating that they may not lose any codes or maximally 20% codes, or lose codes at a rate 10× lower than the current interval etc. This provides some inertia in respecifying another interval. But usually the grader will not have to recode many critical regions, otherwise he may just let the hardware come with an automatic proposal.

Figure 3:
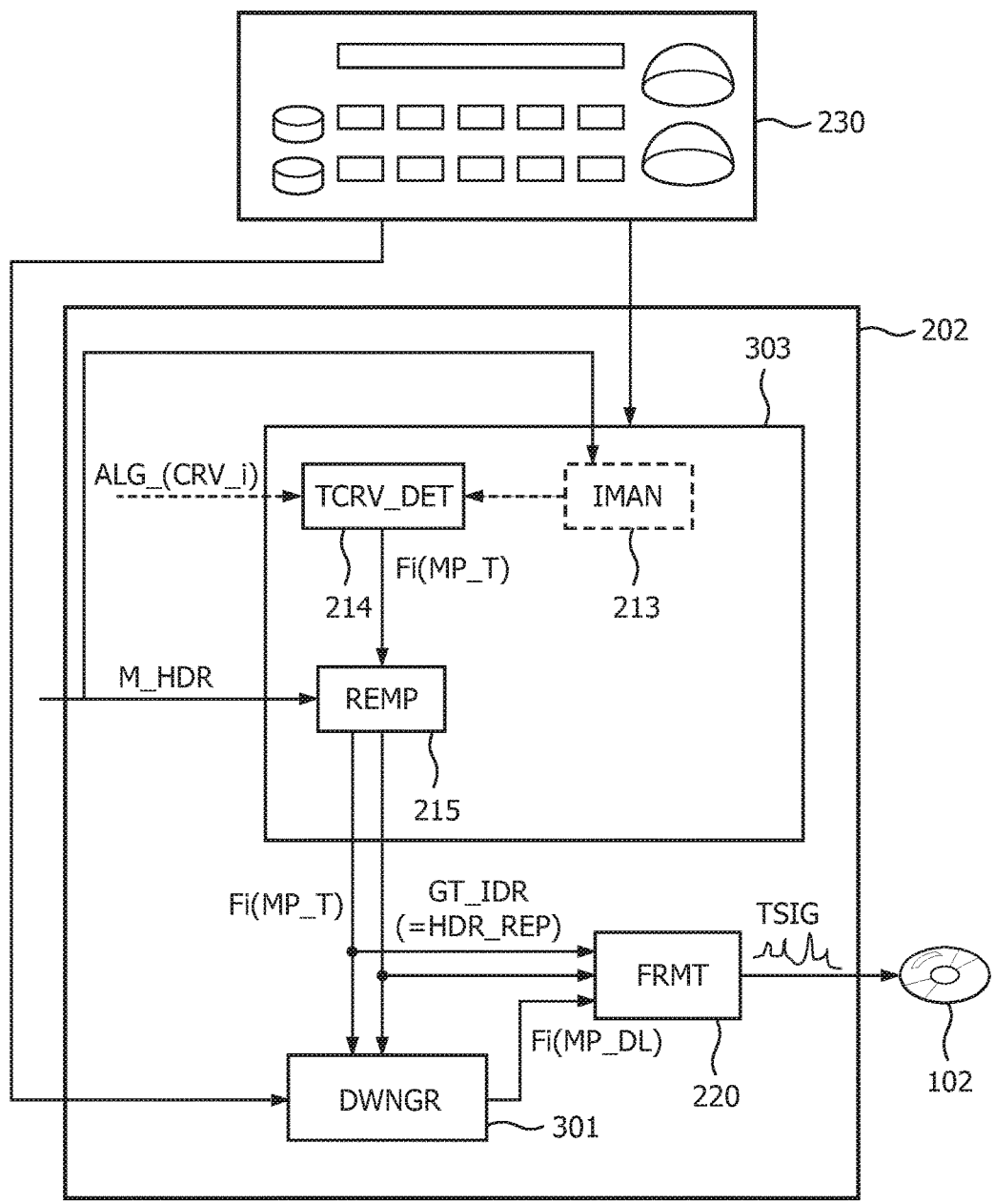
FIG. 3 schematically illustrates a second possible realization of our image coding system in which an automatically graded second LDR image GT_IDR from an automatic grading unit serves as a basis for by further grading defining a final LDR grading Im_LDR by a human grader.

FIG. 3 shows a possible embodiment of an encoding system following the principles of our invention, where the human derives his grading from a technical grading GT_IDR. The reader will understand that technical variants we teach here (e.g. regarding suitable technical color mappings etc.) will also be applicable to the FIG. 2 class of embodiments or other embodiments, and vice versa.

A color mapping derivation unit 214 determines a suitable color mapping (e.g. luminance mapping curve, and corresponding chromatic color coordinates handling strategy) to map M_HDR into GT_IDR. The main purpose of this is to determine a grading GT_IDR which is most suitable from a technical point of view. In particular, one should be able to reconstruct a REC_HDR (by applying CMAP_2 which is the inverse color mapping of Fi(MP_T)) which will be a close approximation to M_HDR (according to some image deviation criterion), or at least fall within a predefined second accuracy from M_HDR. The skilled person understands that there are defined several ways to measure deviations between images. E.g., a popular measure is PSNR, but that is a rather simple, blind measure, which sometimes can give high contributions to differences in noise which are psychovisually hardly visible whereas they measure some real object deviations to a lesser extent. So we'd like to use measures which more tightly measure what happens to the various object, especially in a mathematical framework correlating with psychovisual principles. E.g., the image analysis unit 213 can do some approximate segmentation of the REC_HDR and M_HDR in segments (pseudo-objects). It can e.g. look for relatively smooth segments, and measure an amount of posterization there. A quantity can be e.g. the amount of colors used versus the area of the smooth gradient region, which will result in an accuracy measure which is similar to counting run lengths of runs of pixels with a same quantized color. One may also calculate functional correlations or accumulated differences between the original M_HDR luminance shape over space, and the staircased function in REC_HDR. The skilled person will understand that one can introduce (pre-)semantic information in our evaluation of the accuracy and the resulting choice(s) of mapping algorithms. E.g. if there is a small object only, especially if it is in the background near the side of the image, the object is probably less important and we can encode it with less luma codes, making more codes available for other codes. The skilled person will understand that a total accuracy or error (e.g. as an accuracy image) can be formed from a pre-agreed (e.g. loaded in the automatic grading unit 303 via a software update) set of measurement algorithms, which can take into account geometrical properties like size or position of a segment or object, statistical properties like what kind of texture or color the segment/object is, semantic properties like whether we are looking at a face or sky (with a face or sky detector), etc. The accuracy mathematics may also have special measures for analyzing the HDR effects, e.g. an explosion may be characterized not as an absolute difference of the pixel colors between REC_HDR and M_HDR, but with a relative measure which is based on such parameters like a difference between the average color in the fireball and the surrounding, a variation of colors in the fireball etc. The REC_HDR will then be seen as sufficiently accurate if a measure thereof is below or above a threshold, i.e. even if the fireball is a little less bright or contrasty in the reconstruction, as long as it has sufficient impact because it is still much brighter than the surrounding, the reconstruction is seen as a good HDR reconstruction. Such variants are especially useful for systems which are more critical due to tightness of physical resources like the amount of bits in the GT_IDR encoding. HDR effects may be characterized in a complex way, or just selected as regions of high brightness, e.g. above a relative threshold LT. The skilled person will also understand that in e.g. a recursive strategy to come in steps to the optimal color mapping Fi(MP_T), the color mapping derivation unit 214 may not simply determine its mapping based on an aggregated total accuracy, but finetune based on the partial accuracies. Similarly to our local adjustment example of FIGS. 9 and 10, the unit 214 may cure a face which is represented to coarsely, because it identifies patches in the face, and then allocate more codes by changing that part of the function. The accuracy criterion need not be met by calculating it perse. Rather, we can use a set of pre-agreed functions or color mapping algorithms ALG(CRV_i), which are considered to reasonably fulfill the accuracy criterion for a particular application from a practical point of view. Even if a selected optimal mapping curve still introduces a somewhat more severe error in some part of some inconvenient M_HDR image, that is then considered as acceptable. The determination in any of those scenarios can be both automatic inside the unit 303 without any manual intervention bothering the artistic grader, or it can be partially guided or fully determined by the grader, e.g. by letting this grader select one out of a number of possible mapping algorithms or curves. Typically the unit 303 will know, and the grader will have set, some generic parameters regarding the mapping and encoding situation, e.g. the dynamic range (e.g. CODR or CDR) of the M_HDR image, and the grader may have selected from a menu list that he is currently grading a "night image", etc.

E.g., the image analysis unit 213 may look at the M_HDR image, and find that there are two well-separated lobes in the luminance histogram. A (at least initial) mapping function may then be derived which maps those to appropriate subranges of the 8-bit luma code, taking into account that the human visual system is more sensitive for the darker parts, which will hence need a larger subrange. So on a coarse scale the mapping could go to e.g. [0,170] and [180, 255], i.e. any function which realizes such is a viable candidate. Within these ranges further bending of the mapping curves of Fi(MP_T) may be done, e.g. giving faces a somewhat higher number of codes (which to be clear need not perse correspond to a higher contrast in the face in the ultimate rendering, since the display transform can still reduce the contrast over the face, but then at least we have a good precision of the facial texture and illumination).

The simplest versions can be e.g. a set of parametric gamma-like curves Y_LDR=k*L_HDR below L1 and l*power(L_HDR, gamma)+off above L1. In this case the automatic technical mapping determining algorithms may typically evaluate what the image structure is in the dark regions, and determine a sufficiently well-characterizing linear part therewith. If there are many objects, especially with a complicated geometrical structure (like a shed containing a lot of objects, like woaden boards stored for later construction, metal frameworks, tools, etc. all stacked in between each other in the dark), then the unit/algorithm may decide to allocate more codes to this, by adjusting the first (e.g. linear) part of the gamma-like curve. Similarly, if there are actors in the dark, the system may want to characterize them with sufficient codes, even if they are ultimately rendered very darkly, and the viewer would not see too much detail in the bodies anyway (but note that a viewer could always via his remote control apply a brightening display transform, and a good encoding should cater to that).

Similarly the image M_HDR may be analyzed and segmented in a middle part (e.g. further image analysis algorithms like a motion analyzer can help in determining a region of main action), a bright part, and a dark part, and then a sigmoidal or three-segment curve can be determined for that, etc.

Alternative, the human grader can be prompted to select an optimal technical curve via his user interface 230. E.g., he may choose the optimal one from a number of gamma-like curves, but the skilled person understands this could be other fixed pre-agreed curves, and in a recursive technical optimization the grader could even start tuning curves by e.g. dragging control points CP. The curves may then e.g. have some internal elasticity mechanism, forbidding the grader to choose segments with too low a slope, or other inappropriate characteristics like inversions, double allocation (which cannot be reversed as a CMAP_2), etc. Typically the algorithm will come by itself to a steady state (initial, or momentary) e.g. by sounding a warning if the curve becomes unusably deformed, and then resetting it to a similar one with good reconstruction properties. Typically the system will then generate the REC_HDR, and allow the grader to toggle with M_HDR on his reference HDR display, to see the accuracy or errors. The system will send the GT_IDR to a reference LDR display, so the grader can also check that. This image may already be sufficient in some scenarios and then the grader need no longer make an second Im_LDR, but even if it is a lesser quality LDR grading, some receiving systems me still want or need to use it (e.g. because of a backwards compatible implementation in the TSIG, for a legacy BD player which ignores the color mapping data and just plays GT_IDR; but also e.g. GT_IDR may contain useful information for tuning/interpolating to a final to be used grading for a medium dynamic range display etc.). In case the grader is satisfied, he will continue with the next image or shot of images, and otherwise he will change some of the curve or algorithm further. The encoder may have means to help him with that. E.g. when he scribbles inside a region with larger errors, the encoder may draw on the curve which luminance interval these colors fall in. There may even already be initial analyses of the artefacts, and suggestions (e.g. "doubling of the amount of codes is suggested" and already applying the new curve to obtain a second REC_HDR_2 (by color mapping unit 215), since the unit/algorithms must do as much themselves to spare a busy artist as much as possible from this technical grade—although it is important since it is an easy rough grading for the final look).

Now in the FIG. 3 class of embodiments, the grader will continue to finetune on the GT_IDR image by using color grading unit 301, to obtain his optimal look as grading Im_LDR. In principle he could apply liberally now any color transformation, since IM_LDR is not used to reconstruct REC_HDR. However in a practical system it is useful if a limited set of color mapping algorithms is supported, which allow most or all of the color changes a grader may typically want to do, since their defining data Fi(MP_DL) needs to be encoded in the signal TSIG. Some signal standards could be designed preferably upgradable, so that data of later new color mappings can be written in the metadata (with a new type indicator, ignorable by older systems). This is useful for future decoders which are easily upgradable, such as software running on a computer for decoding movies purchased from an internet-movie database. For systems with a shorter turn-over, for which only at certain times (expensive relative to the total system cost) a new processing chip will be designed, it is better to a priori agree on a fixed set of color mappings (e.g. functions realized as LUTs etc.). Finally all data GT_IDR, Fi(MP_T) and Fi(MP_DL) (or derivations thereof) is formatted by formatter 220 to the specifics of one or more elected signal formats, and sent outwards over some signal communications means.

Figure 4:
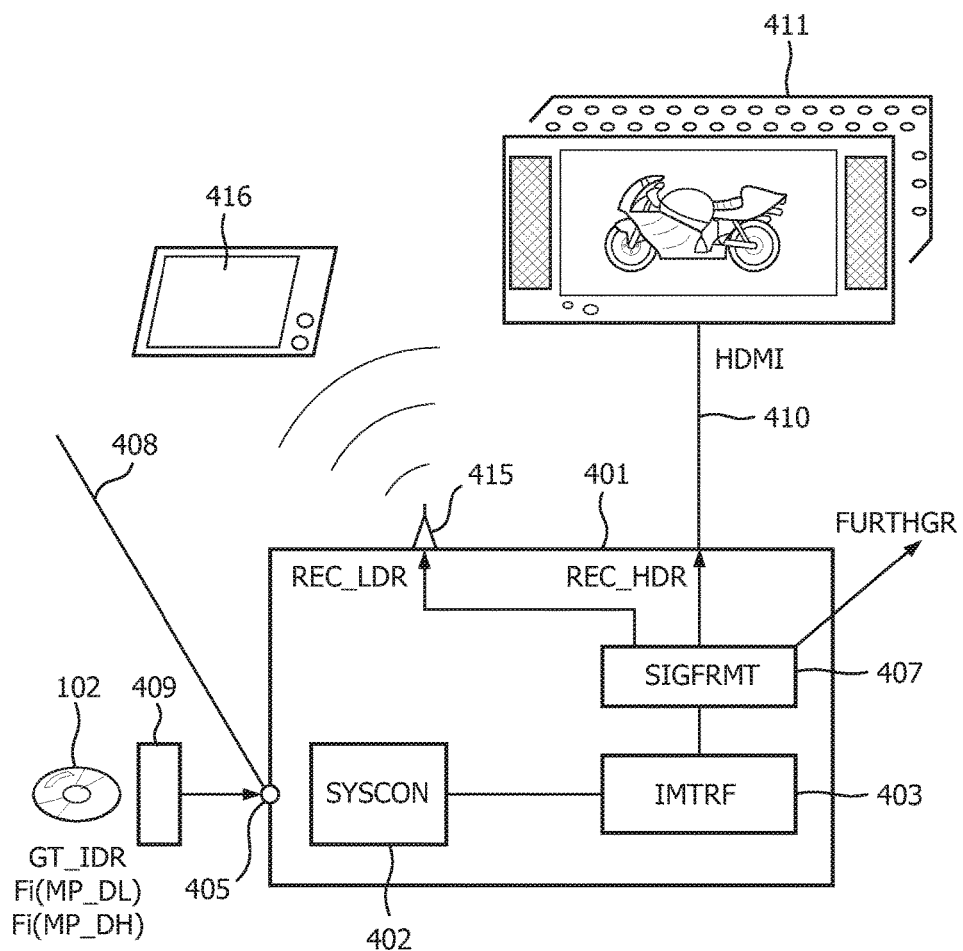
FIG. 4 schematically illustrates a possible variant of an image decoding system, in which a high end decoding apparatus reads the coded data according to any of our coding embodiments, and derives therefrom appropriate signals for various different connected displays.

FIG. 4 shows one possible embodiment of a receiving system, and the skilled person will understand that the can be many such systems. E.g. the image decoder 401 can be comprised in a separate unit (like a BD player, or STB), it may be comprised in a display or display-comprising apparatus itself (e.g. a television, or mobile phone (n.b. the mobile phone although it may not have a HDR display, may still need to read the HDR encoding, and extract the Im_LDR grading therefrom)), a computer, etc. There may be professional systems which comprise the encoder too, e.g. a transcoder on the premises of a content provider, which e.g. creates from a first variant of HDR encoding according to the present principles an image encoding in a second variant, to be distributed e.g. along a pay-per-view system, etc.

The image decoder 401 comprises an image derivation unit 403 which is arranged to do the construction of all the required images. E.g. it may extract the color mapping data Fi(MP_DL) and do an MPEG_HEVC decoding on GT_IDR. And then it applies the color mapping to derive REC_LDR. We have also in this embodiment a system configuration unit 402, which may be arranged to e.g. check what kinds of displays are currently connected, or what kind of storage devices need particular forms of reconstructed images (e.g. a REC_HDR, or an interpolated grading REC_MDR, etc.), and it may suitably control the image derivation unit 403 to do the required processing. In this example we can send data (whether an already optimized e.g. HDR image for the connected display, and/or intermediate data, like e.g. color mapping data, which would allow the television to do a further finetuning on the received HDR image) over a cabled network connection 410, like e.g. an HDMI interface connection, to a television with 2D LED backlighting (or OLED, etc.) 411. High dynamic range displays can be made in several manners. E.g. one may interleave between the LC material structure which in RGB blocks a lot of light, cells which transmit most of the light if driven fully open. Or one may have a laser LED lighted display e.g. in a projector in which one may locally project more LEDs to a DMD IC region if suddenly excessive brightness is needed, or in movie theaters one could have an additional projector structure for creating highlights, etc. Or we can wirelessly via an antenna 415 send data to an LDR display 416, like e.g. a tablet display, etc. We also symbolically show another graded image signal being provided by the formatter 407, e.g. a medium dynamic range image optimal for a display of e.g. 1800 nit peak_white, and sent to such a display, or to a storage memory for later use, or via a network to another place of the user, his mobile phone residing somewhere in the outside world, or one of his friends, etc.

Figure 5:
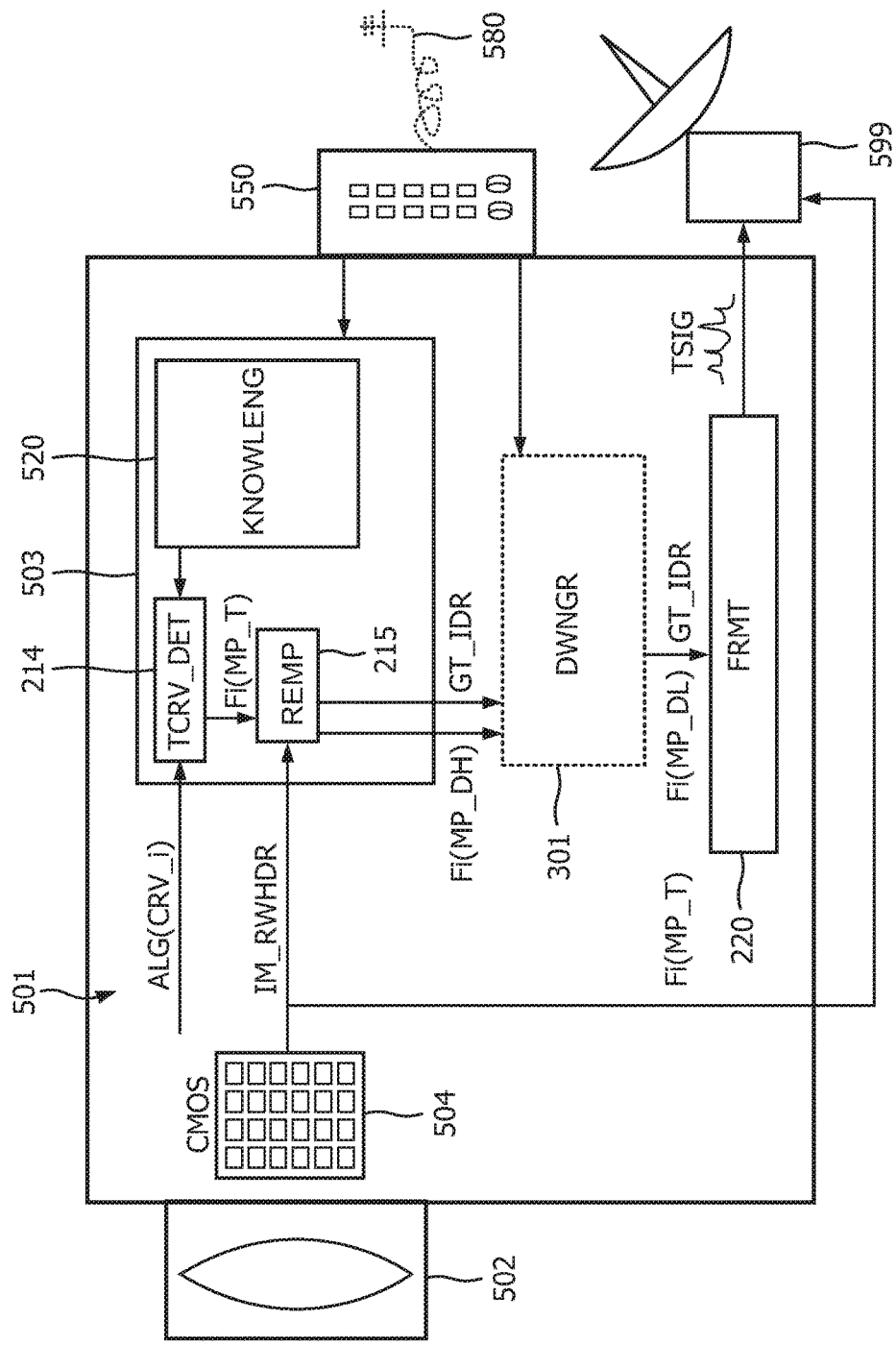
FIG. 5 schematically illustrates an encoder embodiment according to the principles of our invention being incorporated in a camera.
Figure 6:
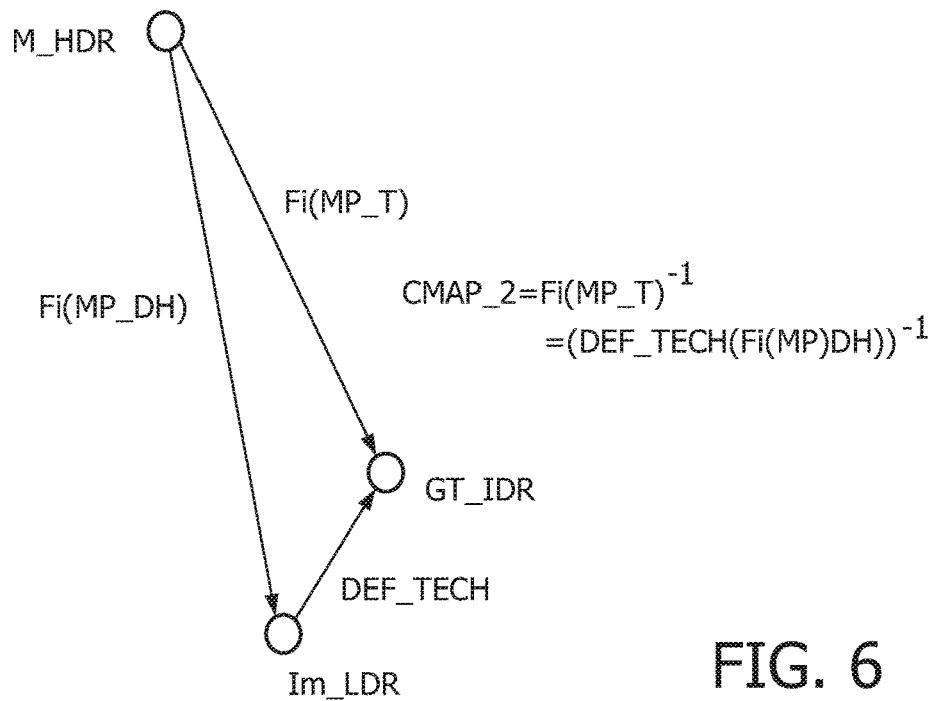
FIG. 6 schematically illustrates a principle behind a variant of our encoding, shown as a logical graph of color mapping relationships between gradings.

FIG. 5 shows our components know inside a camera 501, which gets a RAW image from an image sensor 504 through a lens 502. A knowledge engine 520 may be configured in various ways to obtain structural, statistical and/or semantic knowledge by studying captured RAW pictures, and guide the technical mapping derivation by color mapping derivation unit 214 as exemplified above. The camera may have its own (connected or remote, e.g. from a display apparatus for the director and/or DOP to follow the capturing, and steer via communication antenna 580) user interface 550 for influencing the technical mapping algorithms, like e.g. changing the local contrast of some luminance interval. The mapping to GT_IDR may be used to have a quick preview image, where then a HDR image encoding is sent, e.g. for final or intermediate recording (in some cases the steered camera may already do a sufficient LDR-container grading, i.e. encode M_HDR and Im_LDR, but in other cases a first HDR encoding forms a basis for further finetuning grading). This exemplary camera may broadcast to a receiving side, e.g. via a satellite communication antenna 599, or alternative communication means.

Figure 11A:
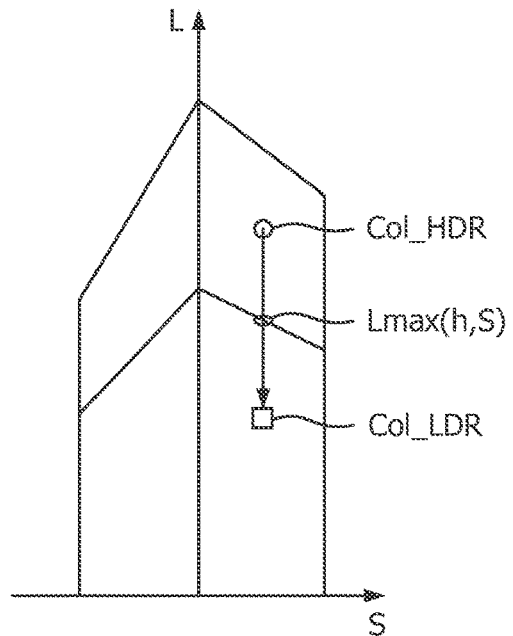
FIG. 11A schematically illustrates a first example of how to handle the color mapping in 3D color space.
Figure 11B:
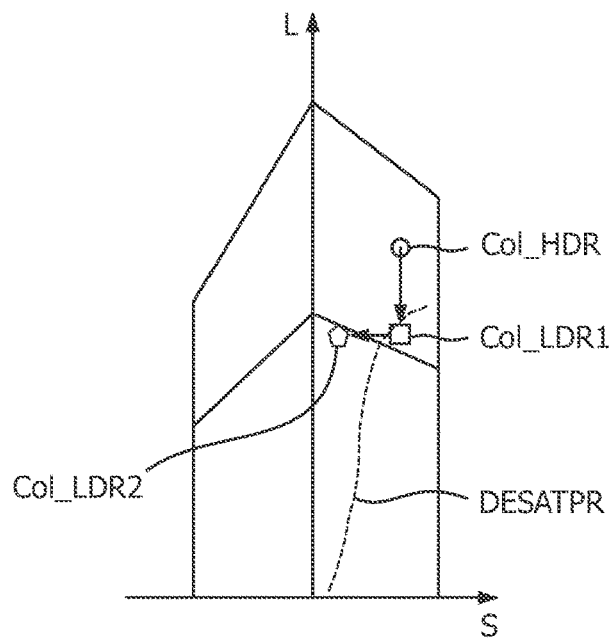
FIG. 11B schematically illustrates a second example of how to handle the color mapping in 3D color space.

With FIG. 11 we give a couple of examples of how the various mapping methods can be realized in 3 (or N) dimensional color space. FIG. 11 schematically shows the gamuts of the HDR reference display (for the M_HDR grading) and the LDR reference display (for e.g. GT_IDR, or Im_LDR), in a slice with luminance on the y-axis, and on of the chromatic coordinates namely a saturation S on the x-axis (these may be defined e.g. as in a CIE definition, and again several options are possible, e.g. CIE_Lab space etc.). We show how a color defined in M_HDR namely Col_HDR gets mapped to its LDR-container corresponding color Col LDR. The upper part in FIG. 11a is a gamut shape conforming color mapping algorithm as described in (not yet published) EP12187572 (PCT/EP2013/069203). The principle is that we first define a function for transforming luminances, e.g. along the neutral axis. Then for each color with chromatic coordinates (e.g. hue h and saturation S) we take the maximum possible luminance Lmax(h, S) for that chromatic color, and scale the luminance mapping function by that value. This guarantees an in-LDR-gamut value for all HDR colors. FIG. 11b shows another possible category of color mappings. Here we just apply any transformation on Col_HDR, so it may end up at Col_LDR1, outside the LDR gamut. Then typically we follow with a gamut mapping algorithm, which brings the color by e.g. desaturating inside the LDR gamut onto Col_LDR2. Instead of a two-step projection, we can also determine for each luminance which is the worst situation, i.e. which pixel will be furthest from the maximum saturation for that luminance of the LDR gamut. We can derive a desaturation function DESATPR therefrom, and remap all colors taking this desaturation into account. There are also other ways to determine a desaturation algorithm. A third category of color mappings will work on RGB space, and then applying mapping functions on those means that the colors also stay in both gamuts. Any function can be used for handling colors, e.g. de local functional remapping of a saturation-correlate, only along those regions of the luma axis where it is desirable, end especially in a technical grading the actual values matter less, as long as for the to be used gradings reasonable colors can be derived therefrom by appropriate further mapping strategies.

We will now elaborate further on useful saturation mappings in an HDR framework, which can be seen separate from other teachings in this application. Brightness and lightness are derived from the human cone responses, which have an activation state of cone-opsin molecules, and show how much light is coming from the various colors being a function of both the object reflectivity characteristics and its illumination (lightness being a greyness estimate compared to a reference white by the brain analyzing all spatial cone signals from a geometrically extended complex scene image). Hue is a function of the spectral activation proportions (per monochromatic or polychromatic activation) of the different cones, and can be estimated from differences in these cone activations. It serves the determination of dominant colors, e.g. the wide-band nature of various molecules allows identification of particular chemical content like e.g. the red ripeness of an apple. Under slowly varying relatively easy to estimate illuminants like sun+skylight, the various discriminatable hues can serve well for many visual tasks. Saturation or purity is a measure of how the color channels of the ganglion cells and further parts of the visual system are excited compared to neutral (grey) stimulation. I.e., it is the amount of pure color (e.g. a narrow-band spectrum color) added to a neutral color or vice versa. With the hues topologically ordered on a circle in color space, a radial dimension being a saturation was needed. Painters use the principle by adding a white color to a pure color like red, producing a sequence of tints. In nature saturation is determined by two important principles. Firstly in specular/glossy media the white illuminant is strongly added to the object-colored light from deeper interactions, leading to strong desaturation, but high saturation in non-specular directions. More importantly, the saturation is related to an amount of pigment, and this may e.g. be used by an animal to judge the health of a potential mate. Saturation exists in two "variants". Firstly there is the brightness-dependent one which may be modeled with colorfulness or chroma, since brighter colors look more saturated. This can be modeled in cone-shaped color spaces in which a color plane (e.g. uv) becomes progressively wider along the brightness axis. The human brain can again discount the illumination and judge how intrinsically saturated an object is, with monochromatic reflections being the theoretically most saturated situation. This can be modelled in cylindrical spaces, in which the color plane shape stays the same along the brightness axis.

Physically such a cone or cylinder could be extended towards infinity, since one can make ever brighter colors, but technologically this makes little sense, since any actual recording or reproduction system has limits. Already the cones of the eye in a certain adaptation state (an amount of cone-opsin made ready in the cone, and intermediate molecules being in a state to multiply any cone-activation sensation, until ultimately a "digital" signal of an amount of pulses along the neurons in obtained) will at a certain moment bleach so that so many cone-opsin molecules have been activated that accurate color detection is no longer possible for some time, which occurs when one looks at a bright lamp. A similar thing happens with e.g. a (say slide) photographic recording. At a certain moment some maximum white must be recorded (and later reproduced), and scene object luminances above that will clip to peak-white. The same happens for any additive RGB space, whether it is just an encoding space which may be related with a reference monitor to make it absolute, or an actual driving signal space for an actual display. Such spaces can be topologically equated with double cone spaces. E.g. painters know it as they can make shades with diminishing chroma but the same saturation by adding black to pure colors, and make tints towards pure white at the top of the upper cone. I.e. at the top of such a space there can be only unsaturated (zero-chroma) colors, which is inconvenient in relation to other colors which may exist in nature, like e.g. those in a wider gamut of e.g. a higher dynamic range display. E.g., what to do with a color which has been dimmed down brightness wise to the LDR (lower dynamic range), but which still resides in the upper cone? Do we heavily change its saturation, or maybe dim down further? And what if that color is just in an intermediate space which serves to still be boost-mapped to a larger space again?

So for such situations, in addition to theoretical saturations of any color, one may need to look at saturation and saturation modifications in any limited space of allowable colors. Having any mathematical transformation within such a space (typically cylindrisized), especially useful if one maps between spaces which can at least be largely collocated (such as e.g. a scaled [0,1] HDR RGB space on a LDR RGB space) has the advantage of yielding existing colors, in contrast to transformations which go outside and still need to be translated into realizable colors, however the non-linear nature of the mathematics may distort other appearance correlates like lightness or hue. If we may design starting and ending gamut/space in 3D in any shape, in principle we need not worry about that so much since we can design any mapping strategy.

We can handle a lot of these complications by having a color grader do the desirable transformations, provided he has a minimal (though typically simple, also taking into account that these transformations typically indicate mappings needed for sufficiently faithful, or at least improved compared to blind rendering, determining rendering-situation dependent corresponding colors for various displays, i.e. the hardware ICs or software in those displays or connected video processing boxes should preferably use only simple mathematical functions, with the complexity being handled by sampling all possible to be related color rendering scenarios by the grader defining a few important grading situations between which can then be interpolated for other in-between rendering situations) set of mathematical saturation-determining functions he can specify.

It is known that mapping between different dynamic ranges can lead to colors which are either to pastel, or to cartoonishly saturated, and the situation can be complex with some graders potentially having critical desires (e.g one may be critical for faces, but also for the blues in water, or even the color look of dark clouds).

Figure 15A:
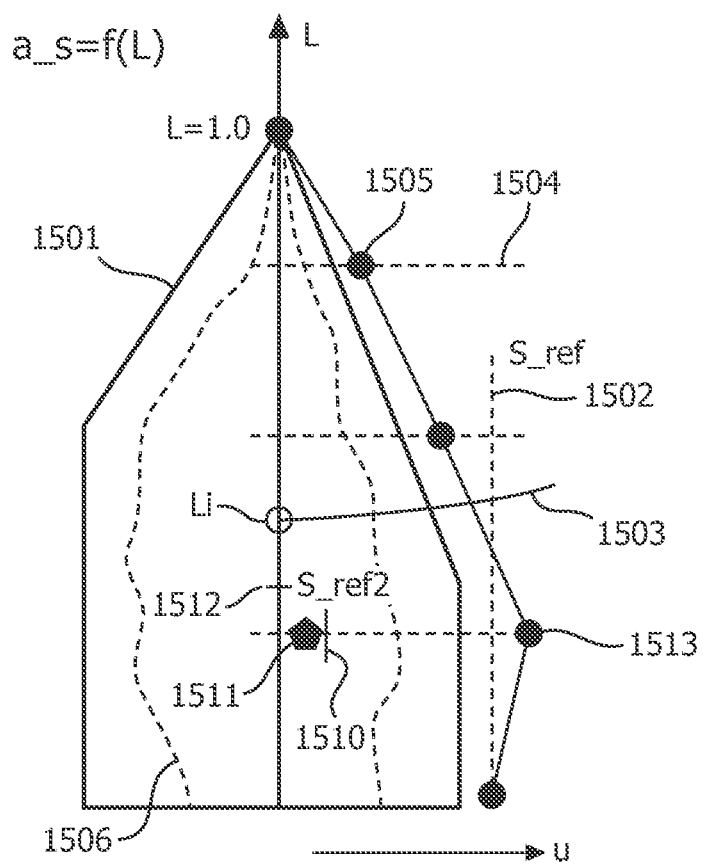
FIG. 15A schematically illustrates a first useful new strategy for saturation processing, which is especially interesting for grading to color representations having a different luminance structure, such as e.g. because of an intended rendering on a display of a different luminance dynamic range.

Our novel saturation processing can be used not only on technical gradings, but in fact on any graded image (e.g. HDR master, or an LDR grading; to obtain any other image grading, of a different or similar dynamic range; i.e. optimally looking when rendered on e.g. an HDR 2000 nit display), and even on raw camera captures, whether introduced into another appliance such as a grading computer, or even still in the camera. To describe the processing in principle we need no input color space (which may be the same as the output space, or anything else e.g. a larger space), so we will describe it with the output space of any color encoding (whether as intermediate, or device dependent directly usable for rendering). We will describe the principle with an Luv space of the cylindrical type, i.e. the planar directions of which we show only the u (red-green) axis in FIG. 15a form triangles of the same size along the normalized luminance axis L, until the tent starts shrinking to white. Of course other possibilities can similarly be implemented, and instead of a physical luminance on may use a more psychological quantity like e.g. a lightness as the third axis. The gamut of all actually realizable colors is 1501. Now one can apply a mathematical transformation which moves colors (either inside or outside the gamut) in a direction of increasing or decreasing saturation, which is represented by curve 1503. Although this illustrates the mathematical principle, FIG. 15a may typically also be the user interface view a color grader sees in one of his subwindows, a main window of course showing the color appearance effect of the transformations on a to be graded or re-graded image. In principle we could use any mathematics for the saturation, but preferably it will be a function which largely decouples the coordinates, i.e. has mostly an effect on saturation, not or little changing hue or luminance or lightness. In practice (although of course the space being only a simplistic model of actual color appearance, in the end there may be still some visible side effect on non-saturation aspects of the colors) the mathematics may be an orthogonal one, so although we show a generic variant with a slightly bending saturation change curve (i.e. also slightly lightening colors when saturating them), oftentimes this will just be a line in the plane orthogonal to the L axis. To have an easy yet powerful control over the saturations of objects or regions giving a total look to an image, the grader has now a possibility to not only define a global saturation multiplier, but a multiplier which depends on the luminance of colors to be processed. This function a_s=f(L) may be recorded as a parametric function or a lookup table. The relevant luminance Li which defines which colors are to be selected for processing is determined by the achromatic color on the curve 1503. Now the only thing needed is some reference saturation level S_ref (1502), which could be equated with a normalized value 1. We assume in this exemplary embodiment that the saturation is defined as the Euclidean length, i.e. sqrt(u*u+v*v) and e.g. in an Lab space that would be sqrt(a*a+b*b), but of course other definitions would be possible. A practical choice for this reference level would be to put it at the (u,v) position of the most saturated of the three (R,G,B) or more primaries defining the color space. Now a quick and simple and normally sufficiently precise way to define the saturation curve a_s=f(L) would be for the grader to determine sample points for a number of luminances (level 1504 etc.) on the luminance axis. He marks those with dots 1505. The position of those dots determine the saturation, and whether it's a boost or reduction. The Euclidean distince of dot 1505 to the L axis is compared to the distance of the reference cylindrical sleeve S_ref, and if it's e.g. 0.3 with S_ref=1, then that means that all colors with that luminance should be dimmed by multiplying their saturation by 0.3 (n.b. multiplicative operations should be sufficient for saturation processing, although other functions could similarly be used too of course). In the darker region dot 1513 specifies a saturation boost for those reds.

Figure 15B:
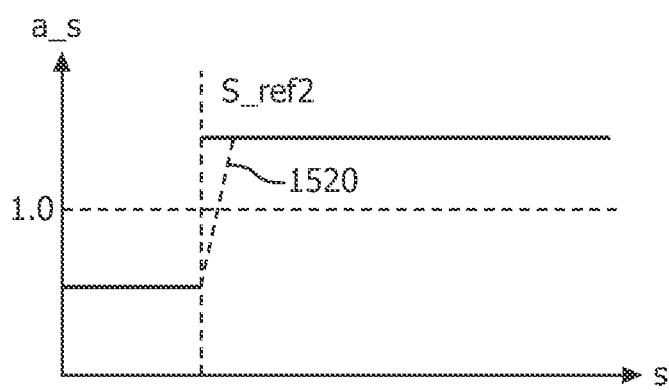
FIG. 15B schematically illustrates a second useful new strategy for saturation processing, which is especially interesting for grading to color representations having a different luminance structure, such as e.g. because of an intended rendering on a display of a different luminance dynamic range.

So say e.g. that—however the input image was generated, e.g. by down-mapping from an HDR master—the grader considers that the lighter colors are of sufficient quality, but the darker colors could do with a saturation boost, he may determine a luminance level (e.g. 0.25) and for that position specify a dot on say 1.8. To save time, the algorithm will determine a full curve spanning the entire 0.0-1.0 luminance range from that, e.g. a linear interpolation may apply that 1.8 down to the blacks, and apply a 1.0 multiplier to colors above the L-0.25 level (of course other interpolation strategies may be used by the software like e.g. splines, and the grader can add further dots if he wants to further finetune the color look). Although not necessary, it may be advantageous if the grader also sees the volume of actually occurring colors in the image 1506. In FIG. 1506 we have only shown the initial situation before saturation processing, but typically the final situation (or a continuously changing volume) will be shown too, which in addition to looking at the actual processed (intermediate or output) image gives the grader an idea of where colors move close to the gamut boundary and clipping or soft clipping may occur (there may be a built-in strategy to non-linearly change the multiplier when within a certain region from the gamut boundary; and such behavior defining options will typically be switched on or off in software by the grader before starting his grading). Although such luminance-only dependencies will for many situations be sufficient, and may be advantageous if the grader can define different behaviors for different hues. E.g. he may specify 4 LUTs for 4 hue sectors. As explained above, the same saturation boosting or dimming would apply to the red and the green direction from the L-axis, but as seen the volume of colors 1506 may be closer to the gamut boundary in the green direction that in the red direction, e.g. because the current shot of the movie, or the current still picture, is of a forrest scene (and in a previous grading saturation may have been set high to emulate a sunny look in an LDR encoding). Then the grader may demarcate sectors of hue, and specify the saturation processing in a similar manner as described above. A more complex example is also given where a single multiplicative behavior is not sufficient for at least one luminance level (and maybe hue sector) in the image. E.g. the dark reds may be boosted to make a Ferrari standing in a darker part of the image (say a garage) look nicer, but when these colors also occur in faces, those faces may become too reddish. Thereto the grader can define a second saturation reference S_ref2 (1510), which will now typically also double as a color region demarcation determining which "face" colors will be processed. Compared to that level, pentagon 1511 now shows that the saturations there should be dimmed by e.g. 0.75. FIG. 15*b* then shows how such behavior will then modify the saturation of colors of luminances similar to the one of the L level corresponding to pentagon 1511. In several situations a discontinuous behavior may be sufficient, since the face may occupy a part of color space, and then there may be no other colors up to the Ferrari, but smoothing transitions 1520 may also be applied, either automatically by the software, or finetuned on such a graph in a subwindow by the grader. Also in the other directions, at least luminance and if needed also hue, the grader can determine in which range this behavior should apply, e.g. an upper luminance level 1512 (and similarly a lower luminance level could be specified). Outside this range the saturation processing can discontinuously switch to the other specified behavior, or that may be more gradually if necessary.

Although such processing could in principle be applied to any situation of saturation processing of any image, it is particularly useful when changing between gradings for rendering scenarios with different dynamic range (i.e. e.g. determine an optimally graded encoding suitable for driving a 4000 nit HDR display in a dim viewing environment on the basis of an LDR encoding, or vice versa). The HDR space may then be normalized to the same [0.0, 1.0] range as the LDR space, although that is not necessary. If this is done in a tunability scenario (in which the gradings are defined to be able to realize a good quality rendering under various rendering scenarios, typically display peak_white and surround, where these gradings actually constitute a content-creator approved sampling of what the scene should look like under various situations, avoiding the complex color appearance modelling problem and converting it into simple interpolation between representative gradings), the processing will typically be co-encoded as metadata to an encoding of the input image, for any rendering system to suitably apply it (e.g. if a television has a brightness intermediate to the two gradings, e.g. the original being a LDR 100 or 500 nit grading, and the saturation processing being part of a mapping strategy to obtain a 4000 nit grading, a 2000 nit display may decide to do e.g. half the suggested amount of boosting, or determine a non-linear strategy starting from the co-encoded saturation behavior information).

Figure 16A:
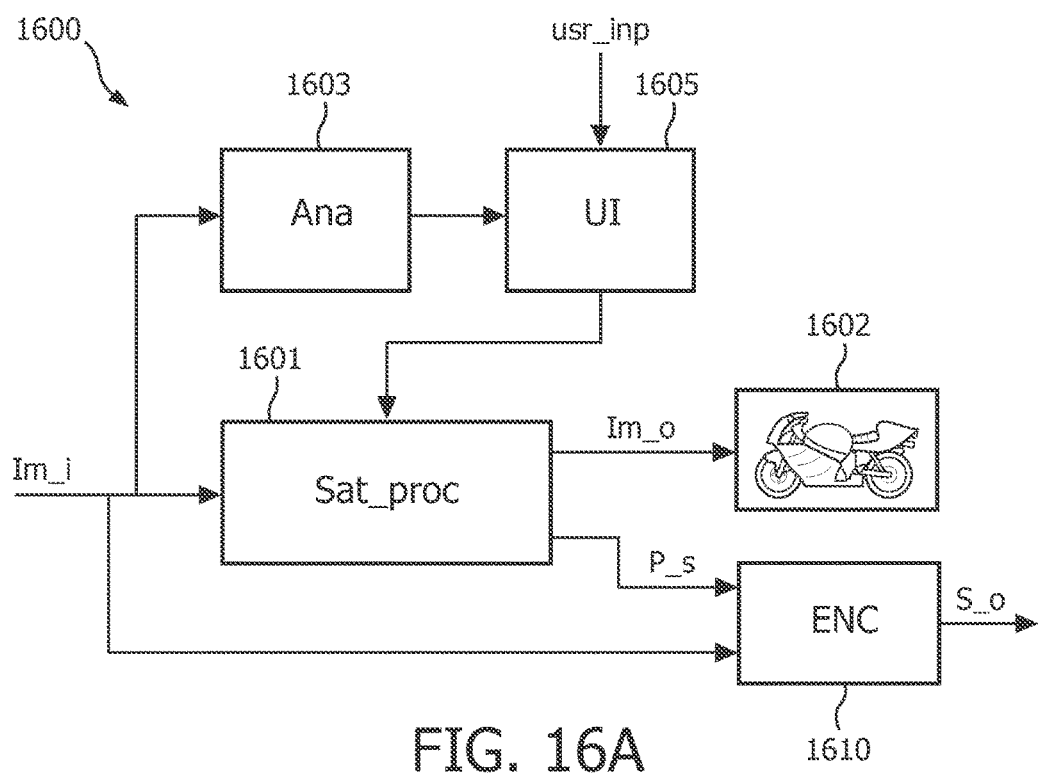
FIG. 16A schematically illustrates a first creation and usage part apparatus for such novel saturation processing.
Figure 16B:
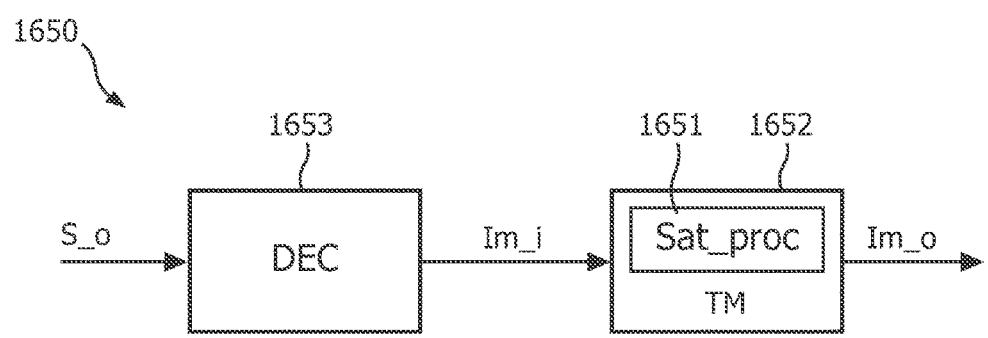
FIG. 16B schematically illustrates a second creation and usage part apparatus for such novel saturation processing.

FIG. 16*a* shows an exemplary embodiment of a grading apparatus 1600, arranged to be able to apply a saturation processing to an input image Im_i (let's say e.g. a LDR grading which needs to converted into a medium dynamic range MDR image for a 1200 nit display; the grader having (at least) such a 1200 nit display 1602 connected to see the result of his specifications), and further also encoding of the specification in a video signal S_o, which typically encodes the video pixels according to a standard like an MPEG standard, and the saturation processing function as metadata thereto, e.g. in parts of the signal, or separate transport packets which may be associated with the video by means like a PMT and a presentation time or other means to define a particular image number in the video with which the processing corresponds (e.g. all images until the presentation time of the next saturation processing function data). The grading apparatus comprises at least a saturation processing unit 1601, which is arranged to apply the saturation change to an input image, according to any of the above elucidated methods. As output it can give an output image Im_o (e.g. with boosted saturation), but also an encoding P_s of the processing function, such as e.g. a LUT a=ai(Li). An encoder 1610 will format this according to the requirements of an agreed (current or future) standardized video signal encoding. It may be advantageous to facilitate user interaction if there is an image analysis unit 1603. This unit will at least look at the definition of how the image is encoded, e.g. to determine the R,G, and B triangular points of the gamut 1501, but it may also generate e.g. the volume 1506. A user interaction unit 1605 implements (typically in software) all functions allowing the user to specify a saturation modification behaviour, and in general interact with the image (e.g. define hue boundaries for a particular processing). So it will allow based on user input usr_inp (e.g. from a keyboard or special grading keyboard) e.g. the dots indicating the amount of saturation boost or dimming to be placed.

Any receiving apparatus e.g. video processing apparatus 1650 may receive such an encoded signal S_o, and apply the specified saturation processing either directly, or derive its own optimal saturation processing on the basis thereof. The video processing apparatus comprises at least a saturation processing unit 1651, arranged to apply such a luminance-dependent saturation strategy as described above on the input image Im_i. This input image may be obtained in various ways, but typically the video processing apparatus 1650 may comprise a decoder 1653, arranged to do e.g. AVC or HEVC video decoding to obtain a pixellized color image Im_i, and the metadata decoding of the saturation processing functions, coverting it to an internally usable format (e.g. this information could be encoded in various manners, like run length encoding, or the decoder may want to convert the specification into another one of different precision etc.). In general the saturation processing will form part of a general color processing/mapping performed by a color processing unit 1652, which may also map the luminances of the colors of Im_1 to new values (e.g. if the input image is an HDR image encoded on [0.0-1.0], the darker parts may be too dark to be used for LDR rendering and may need to be brightened, either before (preferably) or after saturation processing). The video processing apparatus 1650 outputs an output image Im_o, which may e.g. be directly be suitable on a particular display (there may of course be further conversion such as to take display aspects like its internal EOTF into account, but that is unimportant for the present discussion), or the Im_o may be outputted for other use, e.g. storing on a memory like a blu-ray disk, or on a video server etc. Such a video processing apparatus 1650 may e.g. be incorporated in a television, computer or settopbox, or a professional apparatus like e.g. a digital cinema video handler for in the cinema, or a computer system of an image analysis department etc.

Figure 17A:
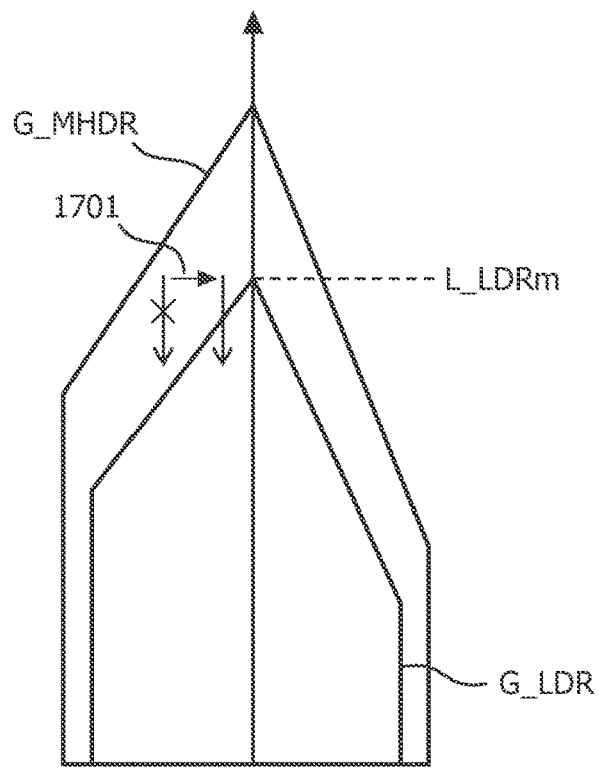
FIG. 17A schematically illustrates a first possible use when gradings for a higher and lower dynamic range rendering situation are required.
Figure 17B:
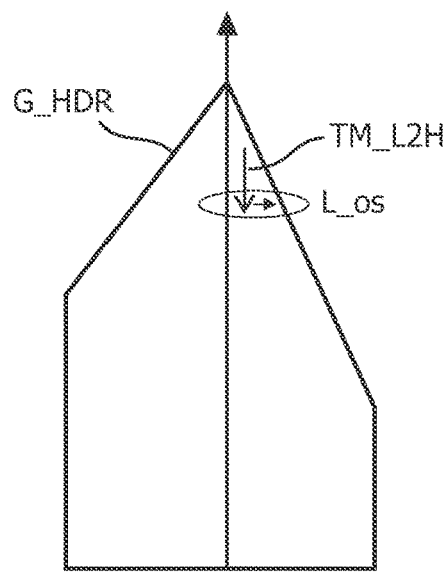
FIG. 17B schematically illustrates a second possible use when gradings for a higher and lower dynamic range rendering situation are required.

For further elucidation we give two examples of possible use in a tunability scenario in FIG. 17. In FIG. 17*a* we want to derive LDR colors from a HDR master grading, according to criteria of the grader like good local contrast, simulated appearance of light sources or bright areas etc. For the tone mapping in the luminance direction we assume we use a chromaticity (u,v) preserving mapping, but we don't want to scale everything to the maximum of the output gamut like in EP12187572. This risks for some colors to fall outside of the output gamut G_LDR, even if we bring all luminances to within the range topped by L_LDRm. The grader can solve this technical problem by an artistic optimal balance of brightness versus saturation, by prior to luminance down-mapping doing a saturation decrease in the HDR input color space (arrow 1701). FIG. 17*b* gives another example, this time with an intermediate encoding. What we see is the input and output space (and gamut) being defined in a similarly normalized hence collocated way. We have an intermediate image encoding of an HDR image (i.e. an image of sufficient luminance information to be usable for HDR rendering), which however has been encoded (tuned) somewhat to be also still reasonably renderable on a lower dynamic range display (either directly or with some final optimizing color mapping typically implement by a display-side color mapping unit, e.g. inside the display). This means that e.g. a bright outdoors region has been encoded with luminance values there were the luminance mapping arrow TM_L2H starts. The tradeof was to give some brightness kick in these image regions and their colors (when used e.g. directly in a lower dynamic range rendering), then the saturation needed to be reduced due to the mathematical shape of the gamut. For HDR rendering one wants these regions bright, but not near the maximum of the gamut, since those luminances are reserved for lamps and explosions, i.e. in the normalized HDR output gamut G_HDR, one needs to transform the colors giving them lower luminances (in luminance regions L_os). Now these colors look paler than they should (could) be, so the grader will co-specify a saturation boost for obtaining the final rendering, but for those luminances (at least), because other regions of color space may be fine.

Typically the above will be realized as various embodiments of an image color grading apparatus (1600) comprising:

an input (240) for a color input image (Im_i), and user interaction unit (1605) arranged to allow a color grader to specify a saturation processing strategy comprising at least first saturation change factor for a first range of luminances of colors to be processed, and a different second saturation change factor for a second range of luminances of the colors to be processed, the first and second saturation change factors preferably being multiplicative.

The characterizing at least one factor for the luminance-dependent saturation change could be various, e.g. a coefficient could specify parabolic or sigmoidal saturation change behavior along at least one constant (or approximately constant) luminance line (e.g. the sigmoidal behavior in a plot like in FIG. 15*b* may start with a small saturation dimming, and then sigmoidal grow to a large boosting for higher values until some maximum which would start clipping a considerable amount of highly saturated colors in the input image, but of course a further parameter could be encoded for that luminance level, for decreasing the saturation boost again in those areas to 1.0 or even below, to make those colors fit better in the available gamut), but in many situations a multiplicative factor changing an input saturation s in into output saturation s_out=a*s_in will be of sufficient control complexity and visual precision.

Although some embodiments may only specify for one or a small region of luminances a saturation processing characterizing factor (the rest of the colors e.g. defaulting to staying the same which would be identical to multiplying with a factor 1.0), it may be advantageous to specify factors for the entire possible luminance range of colors in the input image (e.g. 0.0-1.0) or some other luminance range, of which some colors may have saturation processing defined even if they do not occur in the input image. This can be done either by actually specifying them (e.g. the algorithm creating a continuous interpolation and the grader either accepting or correcting that), which may be co-encoded in the image signal S_o as e.g. a LUT of sufficient precision (which could still be further interpolated at a receiver side), but it is sufficient if the required processing for each possible color with luminance Li is derivable, i.e. the metadata specifying the saturation processing strategy for a receiver may just comprise functional parameters, or positions of dots like 1505 etc.

If more precision is required, it may be advantageous if that user interaction unit (1605) allows specification of saturation processing based on further properties of colors in color space, such as e.g. a hue dependency, like e.g. s_out=fi (L, h_i), in which there is a set of h_i's being centroid hues for hue sectors, and a color (u,v) is processed by a saturation mapping based on nearest proximity to all those centroid hues, or another hue-dependent definition s_out=fi(L, f_hi( )) in which f_hi( ) is some function or algorithmic strategy mapping the hue of an input color to some coefficient i, which defines a particular saturation processing strategy. Similarly, there may be various strategies for different saturation subranges of at least one luminance range (at or around Li), and one could treat the complementary hues as if they were of negative saturation. This may be mathematically defined as e.g. s_out=fi(L, f_si( )) in which now there is a categorical (e.g. boolean if two regions are involved) allocation based on the saturation of colors (u,v) of the input image to be processed. Although this precision will usually be sufficient, one may in general define strategies which differ based on both hue and saturation of colors in selected luminance subranges.

So we described a method of specifying a saturation processing strategy for an input image (Im_i), comprising specifying at least first saturation change factor for a first range of luminances of colors of the input image to be processed, and a different second saturation change factor for a second range of luminances of other colors of the input image to be processed, and preferably comprising an encoding of this strategy as metadata associated with the input image, and variants thereof.

A complementary apparatus thereto will be a video processing apparatus (1650) comprising;

an input for an input image (Im_i), and a saturation processing unit (1651) arranged to apply a first saturation change to colors of the input image falling in a first range of luminances, and a different second saturation change to colors of the input image falling in a second range of luminances, the video processing apparatus comprising means to obtain a first and a second saturation change factor characterizing the first respectively second saturation change, wherein this means preferably comprises a decoder to decode the first and a second saturation change factor from metadata in an image signal (S_o). Although this apparatus may be part of a system at a single location or in single use, typically a grader or re-grader for existing content will specify the gradings once, and then at a later occasion and different the usage of these gradings will happen by the video processing apparatus. This may e.g. typically be a consumer apparatus. The consumer may have bought a movie over the internet, which he has watched e.g. 5 years ago on his LDR display. Now, still having the rights to view the content, he indicates to the management module on the server that he has bought a HDR display, and he desires to receive the metadata for the images of the video program, specifying inter alia this saturation. Of course the user may also purchase the video encoding (pixelized image colors)+the color (saturation) processing metadata on a single memory product, such as e.g. a bluray disk, solid state memory stick, or pre-installed on e.g. a video player device like a portable player etc.

This corresponds with a method of video processing comprising applying a first saturation change to colors of an input image falling in a first range of luminances, and a different second saturation change to colors of the input image falling in a second range of luminances, and the various embodiments thereof according to the above explained elucidating principles.

Figure 13:
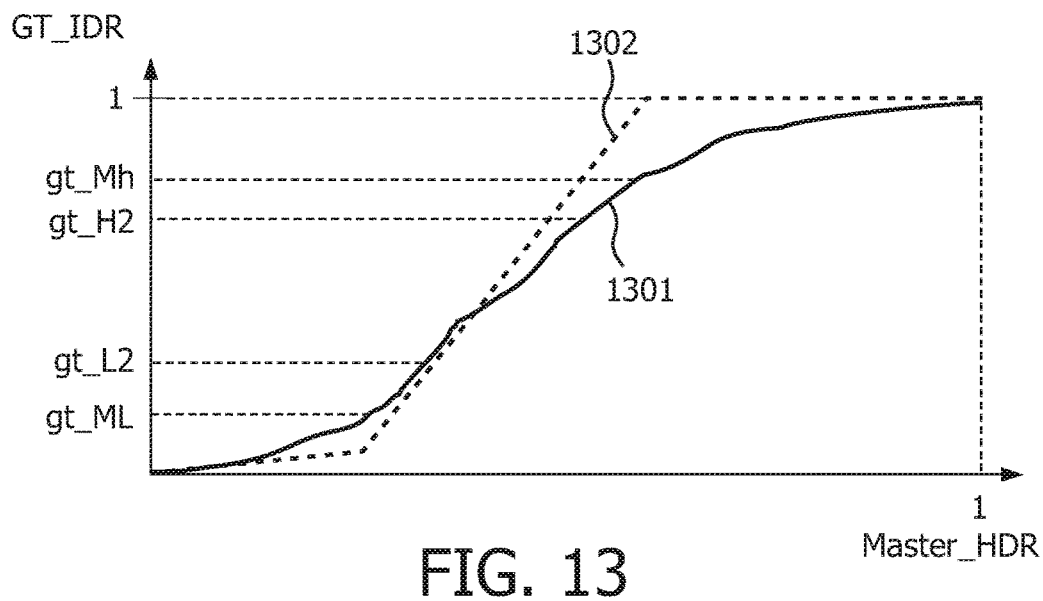

FIG. 13 shows an example of how different LDR images can be obtained for rendering. In this example we have chosen a smooth curve 1301 for technical grading, which allows to recover all luminance ranges of the original to be encoded master HDR image (whatever range that may have had) to a reasonable precision. When we save this in the technically graded LDR image GT_IDR, a "dumb" legacy system will although the picture will be recognizable, render a somewhat bland picture on an LDR display, with unpreferred contrast in the main regions like the actor. Any such system could use automatic processing to increase that contrast or otherwise try to optimize the picture, but would need to do that blindly. It would be much better if the content provider can encode what the receiving side can do to make a better LDR grading than the technical grading. The data required for specifying such second tone mapping from the technical grade GT_IDR, can be as simple as specifying two boundaries gt_Mh and gt_Ml which indicate where the main information resides in code space, and which other colors may be (seriously) deteriorated at the costs of others. The receiving side system need then only stretch the lumas taking these important values into account. We have shown this in a graph 1302, which when applied directly to the display (with known calibrated properties, e.g. standard gamma and viewing environment behavior) will result in rendered luminances on the x-as according to that graph. In this example the receiving end color mapper has decided to maj orly stretch the blacks, retaining a little of posterized information of the HDR still, however that may be rendered under the giving surround environment, and has decided to use a hard clipping strategy, mapping gt_Mh to white (i.e. defining it as the LDR white in the total HDR color space). All colors above can then not be rendered on this e.g 700 nit display. Of course more complex specifications may be co-encoded about what a receiving side color mapping should do with the received GT_IDR encoded image, to obtain optimal looks on one or more intended displays (e.g. 700 nit do processing X, 1500 nit do Y), and this may all be defined in color mapping functions and applied on the basis of the received GT_IDR image (e.g. further characteristic gray values can help in further parametrically specified improvement of the to be obtained LDR grading, or 1 explicit mapping strategy may be specified for the entire range, per receiving display category, and this can be done e.g. with a LUT of boost factors [between 1/X and Y] per luminance value). So simple decoding systems will render a reasonable LDR picture, and decoders capable of handling all the present possibilities will yield an optimal LDR or HDR or any MDR (medium dynamic range), or ODR (outside typical dynamic range, like subLDR with extremely low contrast) images. Although our framework allows for specifying exact gradings for N LDR (and other) viewing scenarios (e.g. 100 nit and 500 nit tv under dark, and dim, and bright viewing scenarios=6 gradings), it is of course not always necessary to render an optimal grading, but rather a good quality image will also do in some scenarios. We illustrate this with FIG. 13 as a mere example. Let's suppose we have a news cast with HDR lighting which is supposed to look very nice, but the LDR being an approximation should just look good, and the grader should be able to define his system in a couple of seconds prior to starting the studio news show. Thereto one may define two additional demarcation thresholds gt_H2 and gt_L2, so that the receiving end can decide how to color map the GT_IDR to obtain its display driving image. E.g. it may be defined (by con-encoding these valeus in specifically reserved codes like MINIMAL_LDR_Low and MINIMAL_LDR_High, or BROAD_LDR_Low and BROAD_LDR_High, or even more LDR subrange delimiters) that gt_ML and gt_Mh are the "ultimate" delimiters of the main action LDR subrange of the HDR scene, which still contain some of the HDR information (like already some brighter parts in the studio), and gt_L2 and gt_L2 contain the "absolute minimum" required for LDR rendering (e.g. no (severe) clipping of highlights in the faces). The receiving end color mapping can then select its strategy for making a LDR image. E.g. it may define a proprietary soft clipping strategy to the regions between gt_ML and gt_L2 and gt_H2 and gt_H2, after having defined a stretching strategy for the middle range of absolutely necessarily well-rendered colors between gt_L2 and gt_H2 (e.g. mapping these to values 20 and 220). But if the receiving system decides to do a hard stretch mapping the [gt_L2, gt_H2] range to [0,255] and clipping outside, the LDR rendering will also look reasonable. The receiving end could decide to choose an option e.g. on the basis of the amount of available surround lighting. So we see the system leaves a lot of possibilities, from tightly controlled complex grading definition systems, to really simple systems having only a few guiding parameters co-encoded. The dynamic range look of a technical grading can e.g. be LDR, or MDR (i.e. looking good on a reference display of e.g. 1200 nit). But the principle is always decoupling the technical requirements (such as reversibility, which is handled in the HDR-GT_IDR relationship) from the artistic freedom (making an arbitrary recoloring of all LDR image objects as far as desired by the grader from GT-IDR, and as complex a mapping function as needed, though typically with a number of supported basis functions (which the decoder needs to support), like e.g. multi-subfunction luma and color mapping (e.g. with LUTs), definition of local object segments and mapping functions therefore, etc.). The user interfaces can be very simple for the grader, e.g. as for many systems the precise finetuned position of gt_Mh, gt_H2 etc. may not be critical, he may define them by quickly scribbling onto a couple of regions of the currently captured image of a scene, like e.g. the newsreader's face, the desk behind which she is sitting, and if required with another pen (defining the outer regions, like brights above gt_Mh) the luminous screen behind her back. Of course more information can be inputted—e.g. with more gt characteristic points—like e.g. shadows or highlights in the HDR lighting of her face, or the table, and this may all be used for more complex color mapping strategies. And further specifications of these regions may be done, e.g. a geometrical function across her face defining a contrast trajectory, and functions to redefine/remap those under various conditions (e.g. leave the brights end of the curve, but brighten the darks a little), etc. All this can be added to the metadata if required, but in general one will prefer simple systems with the minimal amount of required data, and at least one LDR range may be useful (but a second one around a person's colors may be useful too in some scenarios).

Figure 14:
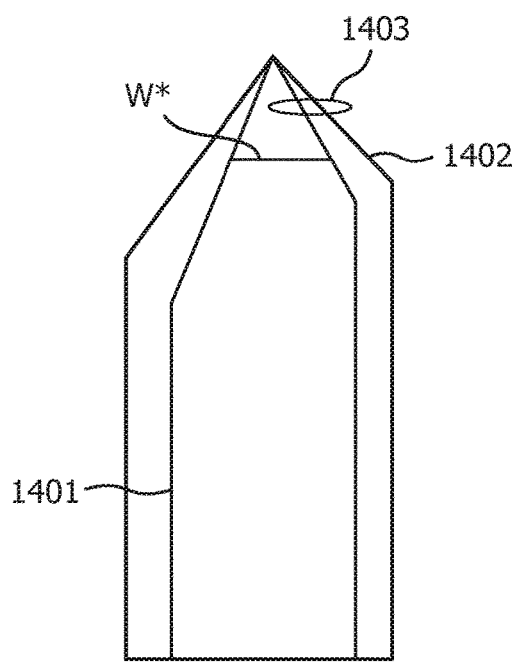
FIG. 14 gives an example of how one can handle further colorimetric limitations in the technical grading, which can upon receipt then be used when generating the optimal image for rendering on a particular display.

FIG. 14 shows an example of how technical gradings can also work on colorimetric principles. Suppose we have a mathematical color space 1401 with primaries definition so that less saturated colors can be made than one may need for some (maybe future) envisaged displays, with physical gamut 1402. That may be not such an issue for the darker colors, since the display may do some boosting of the saturation, and there may be enough recorded information for that to work well (perhaps by applying a post-banding removal filter if needed). However in the tent of the gamut there could be a problem, and this is where we may like to have some saturated high brightness colors instead of more pastellized ones. If this is an issue, the grader can decide to define his grading up to a new white point W* (by topping off the tent, leaving a possibility of defining more saturated colors near the maximally bright colors), but then to avoid confusion, this white point W* (being the brightest possible color according to this code definition) may be co-encoded (to state it's not just a scene with "no white"). Of course the receiving end may also just consider what the brightest encoding is in the input image, and do a rendering therewith, since the visual system adapts with a grey looking as a white for bright displays anyway, but then an LDR system may use it to boost some parts of the picture to its maximum brightness.

The skilled person will understand that many variants are possible for the above concepts. E.g., although in the particular elucidating examples in the Figures we assumed that the data of the color mappings was co-encoded with the image pixel data (GT_IDR), e.g. as metadata within placeholders defined in the image coding standard like e.g. SEI messages or similar, or within a reserved section of the memory e.g. a section of the BD, of course other examples can transmit the color mapping data via another communication channel than the GT_IDR. E.g. the content creator can put additional constraints on the properties of the color mappings or resulting GT_IDR, e.g. he may give it a totally different look than M_HDR and Im-LDR, or even an ugly picture, and supply the color mapping data via a secure channel upon verification of the receiver, or payment, etc.

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components of the invention can be embodied in different variants along any use chain, e.g. all variants of a creation side like an encoder may be similar as or correspond to corresponding apparatuses at a consumption side of a decomposed system, e.g. a decoder and vice versa. Several components of the embodiments may be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. Such data may be (partially) supplied in any way.

The invention or any data usable according to any philosophy of the present embodiments like video data, may also be embodied as signals on data carriers, which may be removable memories like optical disks, flash memories, removable hard disks, portable devices writeable via wireless means, etc.

Some of the steps required for the operation of any presented method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

By image signal we typically mean any of the existing or similar ways to pack image data. Apart from a pixellized structure of color tuplets, which we call an image (or picture), such a signal may contain metadata like descriptors for the meaning of the data like e.g. the image aspect ratio, and further metadata containing useful information relating to the encoded image, such as for modifying it at a receiving side, etc. Signals may have various physical/technical forms of embodiments, e.g. the may be defined as electrical modulations of a carrier wave, or bits represented as mechanical pits, or material modifications like e.g. a local magnetization state, etc.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. An image encoder comprising:
an input comprising hardware configured to receive a high dynamic range input image;
a user grading input comprising hardware configured to allow a human color grader to specify a color mapping from a representation of the high dynamic range input image, to a first low dynamic range image by a human-determined color mapping algorithm, and configured to output data specifying the color mapping; and
a grader comprising hardware configured to derive a second low dynamic range image by applying an automatic color mapping algorithm to the high dynamic range input image, with a color mapping algorithm fulfilling a condition that a HDR reconstructed image falling within a second predefined accuracy from the high dynamic range input image can be calculated by applying a second color mapping algorithm which is the inverse of the automatic color mapping algorithm to the second low dynamic range image.

2. The image encoder of claim 1, wherein the representation of the high dynamic range input image is one of the high dynamic range input image and the second low dynamic range image.

3. The image encoder as claimed in claim 1, wherein the user grading input and the grader are configured to apply a monotonous mapping function on a luminance-correlate of pixels in their respective input image, in at least a geometrical region of the respective input image corresponding to a same geometrical region of the high dynamic range input image.

4. The image encoder of claim 3, wherein the grader is configured to determine the monotonous mapping function from luminance-correlates of pixels of the high dynamic range input image to luminance-correlates of pixels of the second low dynamic range image according to a criterion which determines respective ranges of luminance-correlates of pixels of the high dynamic range input image allocated to respective single values of a luminance-correlate of pixels of the second low dynamic range image, the respective ranges forming a set of luminance-correlate ranges covering the total range of possible luminance-correlate values for the high dynamic range input image.

5. The image encoder of claim 1, comprising a data formatter comprising hardware configured to output into an image signal the second low dynamic range image and at least one of, or both of, data describing the color mapping between the high dynamic range input image and the second low dynamic range image, and data describing the color mapping between the first low dynamic range image and the second low dynamic range image.

6. An image decoder comprising
an image signal input comprising hardware configured to receive an image signal comprising a low dynamic range image, and data describing a first color mapping enabling reconstruction of a reconstruction of a high dynamic range image on the basis of the low dynamic range image, and data describing a second color mapping allowing calculation of a further low dynamic range image on the basis of the low dynamic range image,
an image deriver comprising hardware configured to derive at least the low dynamic range image on the basis of the data describing the second color mapping and the pixel colors encoded in the low dynamic range image.

7. The image decoder of claim 6, comprising a system configurer comprising hardware configured to determine whether the decoder is connected to at least one of a high dynamic range display and a low dynamic range display, and configured to configure the image deriver to determine at least the reconstruction in case of a connection to the high dynamic range display, and arranged to configure the image deriver to determine at least the further low dynamic range image in case of a connection to the low dynamic range display.

8. The image decoder of claim 6, comprising:
an output port including at least one of a wired connection and a wireless connection, to any connectable display; and
a signal formatter comprising hardware configured to transmit at least one of the reconstruction of the high dynamic range image and the low dynamic range image to any connected display.

9. The image decoder of claim 6, wherein the image deriver is configured to determine a further image based on the reconstruction of the high dynamic range image and the low dynamic range image, or the second low dynamic range image and data describing the first color mapping and data describing the second color mapping.

10. The image decoder of claim 6, wherein the image signal input is connected to a reading unit configured to read the image signal from a memory.

11. The image decoder of claim 6, wherein the image signal input is connectable via a network connection to a source of the image signal.

12. A method of image encoding comprising:
accessing a high dynamic range input image;
receiving via a user input, an indication of a color mapping from a representation of the high dynamic range input image defined according to a predefined accuracy, to a low dynamic range image, as a human-determined color mapping algorithm, and outputting data specifying the human-determined color mapping; and deriving by image processing software and/or hardware, a second low dynamic range image by applying an color mapping algorithm to one of the high dynamic range input image or the low dynamic range image.

13. A method of image decoding comprising:

receiving via an input, an image signal comprising a second low dynamic range image, and data describing a first color mapping enabling reconstruction of a reconstruction of a high dynamic range on the basis of the second low dynamic range image, and data describing a second color mapping allowing calculation of a low dynamic range image on the basis of the second low dynamic range image, and deriving by image processing software and/or an image processor, at least the low dynamic range image on the basis of the data describing the second color mapping and the pixel colors encoded in the second low dynamic range image, and optionally also the reconstruction on the basis of the data describing the first color mapping and the pixel colors encoded in the second low dynamic range image.

14. A storage-medium that is not a transitory propagating wave or signal, encoded with an image signal comprising a second low dynamic range image, and data describing a first color mapping enabling reconstruction of a reconstruction of a high dynamic range on the basis of the second low dynamic range image, and data describing a second color mapping allowing calculation of a low dynamic range image on the basis of the second low dynamic range image.

* * * * *

UNITED STATES PATENT AND TRADEMARK OFFICE
CERTIFICATE OF CORRECTION

PATENT NO. : 10,182,247 B2
APPLICATION NO. : 15/616528
DATED : January 15, 2019
INVENTOR(S) : Mark Jozef Willem Mertens It is certified that error appears in the above-identified patent and that said Letters Patent is hereby corrected as shown below:

In the Claims

Column 50, Line 16, cancel the text beginning with "6. An image decoder" and ending with "low dynamic range image." on Line 30, and insert the following claim:
--6. An image decoder comprising
    an image signal input comprising hardware configured to receive an image signal comprising: a low dynamic range image, and data describing a first color mapping enabling reconstruction of a reconstruction of a high dynamic range image on the basis of the low dynamic range image, and data describing a second color mapping allowing calculation of a further low dynamic range image on the basis of the low dynamic range image,
    an image deriver comprising hardware configured to derive at least the further low dynamic range image on the basis of the data describing the second color mapping and the pixel colors encoded in the low dynamic range image.--

Column 50, Line 41, cancel the text beginning with "8. The image decoder" and ending with "connected display." on Line 48, and insert the following claim:
--8. The image decoder of claim 6, comprising:
    an output port including at least one of a wired connection and a wireless connection, to any connectable display; and
    a signal formatter comprising hardware configured to transmit at least one of the reconstruction of the high dynamic range image and the further low dynamic range image to any connected display.--

Signed and Sealed this
Second Day of July, 2024

Katherine Kelly Vidal
*Director of the United States Patent and Trademark Office*